(12) United States Patent
Yang et al.

(10) Patent No.: US 9,053,392 B2
(45) Date of Patent: Jun. 9, 2015

(54) GENERATING A HIERARCHY OF VISUAL PATTERN CLASSES

(71) Applicant: Adobe Systems Incorporated, San Jose, CA (US)

(72) Inventors: Jianchao Yang, San Jose, CA (US);
Guang Chen, Columbia, MO (US);
Hailin Jin, San Jose, CA (US);
Jonathan Brandt, Santa Cruz, CA (US);
Elya Shechtman, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 63 days.

(21) Appl. No.: 14/012,770

(22) Filed: Aug. 28, 2013

(65) Prior Publication Data

US 2015/0063713 A1 Mar. 5, 2015

(51) Int. Cl.
*G06K 9/62* (2006.01)
*G06K 9/68* (2006.01)

(52) U.S. Cl.
CPC ............ *G06K 9/6267* (2013.01); *G06K 9/6298* (2013.01)

(58) Field of Classification Search
None
See application file for complete search history.

(56) References Cited

U.S. PATENT DOCUMENTS

| | | | | |
|---|---|---|---|---|
| 5,315,668 | A * | 5/1994 | O'Hair | 382/159 |
| 6,181,829 | B1 * | 1/2001 | Clark et al. | 382/273 |
| 6,229,923 | B1 * | 5/2001 | Williams et al. | 382/224 |
| 6,347,153 | B1 * | 2/2002 | Triplett et al. | 382/224 |
| 6,493,463 | B1 * | 12/2002 | Nagarajan et al. | 382/173 |
| 6,516,091 | B1 * | 2/2003 | Nagarajan et al. | 382/173 |
| 6,621,930 | B1 * | 9/2003 | Smadja | 382/224 |
| 6,636,331 | B1 * | 10/2003 | Nagarajan et al. | 358/2.1 |
| 6,795,589 | B1 * | 9/2004 | Tlaskal et al. | 382/284 |
| 7,221,775 | B2 * | 5/2007 | Buehler | 382/100 |
| 2005/0096950 | A1 * | 5/2005 | Caplan et al. | 705/7 |
| 2006/0088207 | A1 * | 4/2006 | Schneiderman | 382/159 |
| 2007/0058836 | A1 * | 3/2007 | Boregowda et al. | 382/103 |
| 2007/0253625 | A1 * | 11/2007 | Yi | 382/228 |
| 2008/0092109 | A1 * | 4/2008 | Kinnucan et al. | 717/105 |
| 2008/0092111 | A1 * | 4/2008 | Kinnucan et al. | 717/105 |
| 2009/0324107 | A1 * | 12/2009 | Walch | 382/224 |
| 2010/0119128 | A1 * | 5/2010 | Zhang et al. | 382/128 |

(Continued)

OTHER PUBLICATIONS

Bengio, S., et al., "Label Embedding Trees for Large Multi-Class Tasks", Advances in Neural Information Processing Systems (NIPS), (2010), 1-10.

(Continued)

*Primary Examiner* — Randolph I Chu
(74) *Attorney, Agent, or Firm* — Shook, Hardy & Bacon L.L.P.

(57) ABSTRACT

A hierarchy machine may be configured as a clustering machine that utilizes local feature embedding to organize visual patterns into nodes that each represent one or more visual patterns. These nodes may be arranged as a hierarchy in which a node may have a parent-child relationship with one or more other nodes. The hierarchy machine may implement a node splitting and tree-learning algorithm that includes hard-splitting of nodes and soft-assignment of nodes to perform error-bounded splitting of nodes into clusters. This may enable the hierarchy machine, which may form all or part of a visual pattern recognition system, to perform large-scale visual pattern recognition, such as font recognition or facial recognition, based on a learned error-bounded tree of visual patterns.

20 Claims, 16 Drawing Sheets

(56) References Cited

U.S. PATENT DOCUMENTS

| | | |
|---|---|---|
| 2011/0249891 A1* | 10/2011 | Li .................................. 382/165 |
| 2012/0039539 A1* | 2/2012 | Boiman et al. ................ 382/195 |
| 2012/0090834 A1* | 4/2012 | Imhof et al. ............. 166/250.01 |
| 2014/0282586 A1* | 9/2014 | Shear et al. ................... 718/104 |
| 2014/0283040 A1* | 9/2014 | Wilkerson et al. .............. 726/22 |

OTHER PUBLICATIONS

Deng, Jia, et al., "Fast and Balanced: Efficient Label Tree Learning for Large Scale Object Recognition", Advances in Neural Information Processing Systems (NIPS), (2011), 1-9.

Liu, B., et al., "Probabilistic Label Trees for Efficient Large Scale Image Classification", CVPR 2013, 1-8.

\* cited by examiner

Example of Hard-Splitting into Mutually Exclusive Classes (e.g., Nodes)

Example of Misclassification of Font 3

Example of Soft-Assignment into Mutually
Non-Exclusive Classes (e.g., Nodes)

GENERATING A HIERARCHY OF VISUAL PATTERN CLASSES

TECHNICAL FIELD

The subject matter disclosed herein generally relates to the processing of data. Specifically, the present disclosure addresses systems and methods of generating a hierarchy of classes of visual patterns.

BACKGROUND

A visual pattern may be depicted in an image. An example of a visual pattern is text, such as dark words against a white background or vice versa. Moreover, text may be rendered in a particular typeface or font (e.g., Times New Roman or Helvetica) and in a particular style (e.g., regular, semi-bold, bold, black, italic, or any suitable combination thereof). Another example of a visual pattern that may be depicted in an image is an object, such as a car, a building, or a flower. A further example of a visual pattern is a face (e.g., a face of a human or animal). A face depicted in an image may be recognizable as a particular individual. Furthermore, the face within an image may have a particular facial expression, indicate a particular gender, indicate a particular age, or any suitable combination thereof. Another example of a visual pattern is a scene (e.g., a landscape or a sunset). A visual pattern may exhibit coarse-grained features (e.g., an overall shape of alphabetic letter rendered in a font), fine-grained features (e.g., a detailed shape of an ending of the letter that is rendered in the font), or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
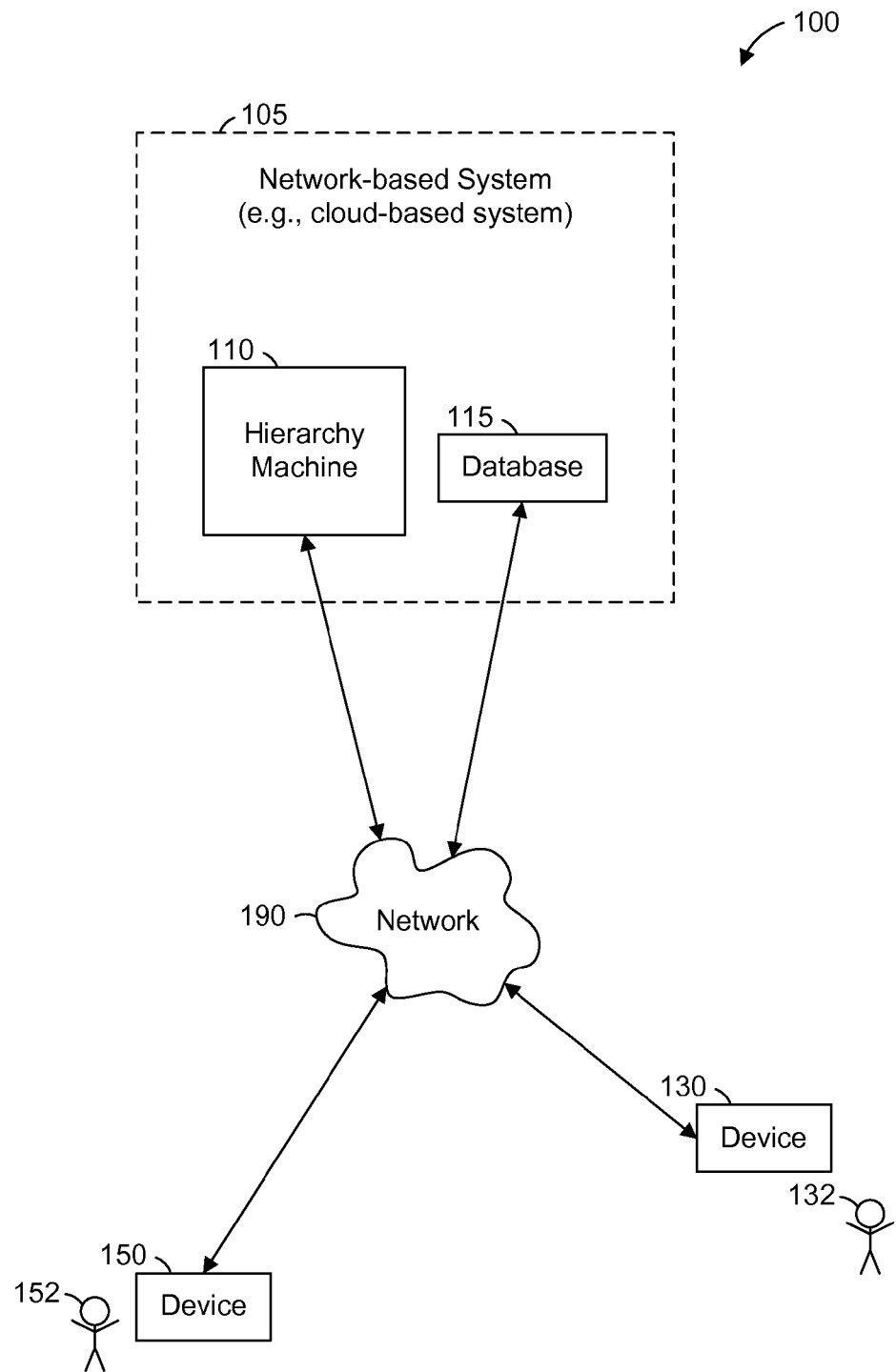
FIG. 1 is a network diagram illustrating a network environment suitable for visual pattern classification and recognition, according to some example embodiments.

Example methods and systems are directed to generating a hierarchy of classes that classify visual patterns (e.g., generating a tree of classifications, categories, or clusters of visual patterns, for subsequent visual pattern recognition in an image, such as, classification, categorization, or identification of a visual pattern within an image). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details. For example, a class of visual patterns may include a class of fonts (e.g., a classification, category, or group of typefaces or fonts used for rendering text in images). In some situations, an individual font may be treated as an individual visual pattern (e.g., encompassing multiple images of letters and numerals rendered in the single font), while groups (e.g., families or categories) of related fonts may be treated as larger classes of visual patterns (e.g., regular, bold, italic, and italic-bold versions of the same font). Other example forms of visual patterns may be supported, such as face types (e.g., classified by expression, gender, age, or any suitable combination thereof), objects (e.g., arranged into a hierarchy of object types or categories), and scenes (e.g., organized into a hierarchy of scene types or categories).

A system (e.g., a visual pattern classification and recognition system) may be or include a machine (e.g., an image processing machine) that analyzes images of visual patterns (e.g., analyzes visual patterns depicted in images). To do this, the machine may generate a representation of various features of an image. Such representations of images may be or include mathematical representations (e.g., feature vectors) that the system can analyze, compare, or otherwise process, to classify, categorize, or identify visual patterns depicted in the represented images. In some situations, the system may be or include a hierarchy machine configured to use one or more machine-learning techniques to train a classifier (e.g., classifier module) for visual patterns. For example, the hierarchy machine may use the classifier to classify one or more reference images (e.g., test images) whose depicted visual patterns are known (e.g., predetermined), and then modify or update the classifier (e.g., by applying one or more weight vectors, which may be stored as templates of the classifier) to improve its performance (e.g., speed, accuracy, or both).

As discussed herein, the system may utilize an image feature representation called local feature embedding (LFE). LFE enables generation of a feature vector that captures salient visual properties of an image to address both the fine-grained aspects and the coarse-grained aspects of recognizing a visual pattern depicted in the image. Configured to utilize image feature vectors with LFE, the system may implement a nearest class mean (NCM) classifier, as well as a scalable recognition algorithm with metric learning and max margin template selection. Accordingly, the system may be updated to accommodate new classes with very little added computational cost. This may have the effect of enabling the system to readily handle open-ended image classification problems. LFE is discussed in greater detail below.

The hierarchy machine may be configured as a clustering machine that utilizes LFE to organize (e.g., cluster) visual patterns into nodes (e.g., clusters) that each represent one or more visual patterns (e.g., by clustering visual patterns into groups that are similar to each other). These nodes may be arranged as a hierarchy (e.g., a tree of nodes, or a tree of clusters) in which a node may have a parent-child relationship with another node. For example, a root node may represent all classes of visual patterns supported by the system, and nodes that are children of the root node may represent subclasses of the visual patterns. Similarly, a node that represents a subclass of visual patterns may have child nodes of its own, where these child nodes each represent a sub-subclass of visual patterns. A node that represents only a single visual pattern cannot be subdivided further and is therefore a leaf node in the hierarchy (e.g., tree).

The hierarchy machine may implement a node-splitting and tree-learning algorithm that includes (1) hard-splitting of nodes and (2) soft-assignment of nodes to perform error-bounded splitting of nodes into clusters. This may enable the overall system to perform large-scale visual pattern recognition (e.g., font recognition) based on a learned error-bounded tree of visual patterns (e.g., fonts or font classes).

For the sake of clarity, visual patterns may be discussed herein in the context of their example form of fonts (e.g., typefaces). Some fonts may share many features with each other. For example, a group of fonts may belong to the same family of typefaces, in which each member of the family differs from the others by only small variations (e.g., aspect ratio of characters, stroke width, or ending slope). When differences between fonts are subtle, classifying or identifying these fonts is different from classifying fonts that share very few features (e.g., fonts from different or divergent families). To address such situations, the system (e.g., the clustering machine) may be configured to cluster the fonts, so that fonts within each cluster are similar to each other but vary dramatically from fonts in other clusters. Each cluster of fonts may then have a specific classifier (e.g., an image classifier module) trained for that cluster of fonts, and the system may be configured to train and use multiple classifiers for multiple clusters of fonts. By organizing clusters of fonts into a hierarchical classification scheme, and implementing a specific classifier for each cluster of fonts, the system may perform visual font recognition with increased speed compared to existing algorithms. Moreover, the system may be readily scalable to large scale problems in visual font recognition. To this end, the system may be configured to perform a two-stage procedure that includes (1) hard-splitting of nodes (e.g., representing font classes or individual fonts) and (2) soft-assignment of nodes to obtain an error-bounded tree in which nodes are allocated into hierarchical clusters.

FIG. 1 is a network diagram illustrating a network environment 100, according to some example embodiments. The network environment 100 includes a hierarchy machine 110, a database 115, and devices 130 and 150, all communicatively coupled to each other via a network 190. The hierarchy machine 110, the database, 115, and the devices 130 and 150 may each be implemented in a computer system, in whole or in part, as described below with respect to FIG. 16.

The hierarchy machine 110 may be configured (e.g., by one or more software modules, as described below with respect to FIG. 2) to perform one or more of any of the methodologies discussed herein, in whole or in part. Such methodologies include hierarchy generation algorithms (e.g., as discussed below with respect to FIG. 3-9). Such methodologies may further include image processing algorithms (e.g., visual pattern recognition algorithms) that may be used by the hierarchy machine 110 to train an image classifier, use an image classifier to classify (e.g., recognize, categorize, or identify) an image, or both. The database 115 may store one or more images before, during, or after image processing by the hierarchy machine 110. Accordingly, the database 115 may store a reference set (e.g., trainer set) of images (e.g., a training database of images for training an image classifier), a set of unclassified images (e.g., a test database of test images, or a production database of captured images) to be processed by the hierarchy machine 110, or any suitable combination thereof. Moreover, the hierarchy machine 110, with or without the database 115, may form all or part of a network-based system 105. The network-based system 105 may be or include a cloud-based image processing system (e.g., visual pattern recognition system) that provides one or more network-based image processing services (e.g., a visual pattern recognition service). For example, an image may be received by the hierarchy machine 110 from the device 130, and the hierarchy machine 110 may perform image processing operations on the image to classify the image according to one or more visual patterns recognized within the image.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the hierarchy machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
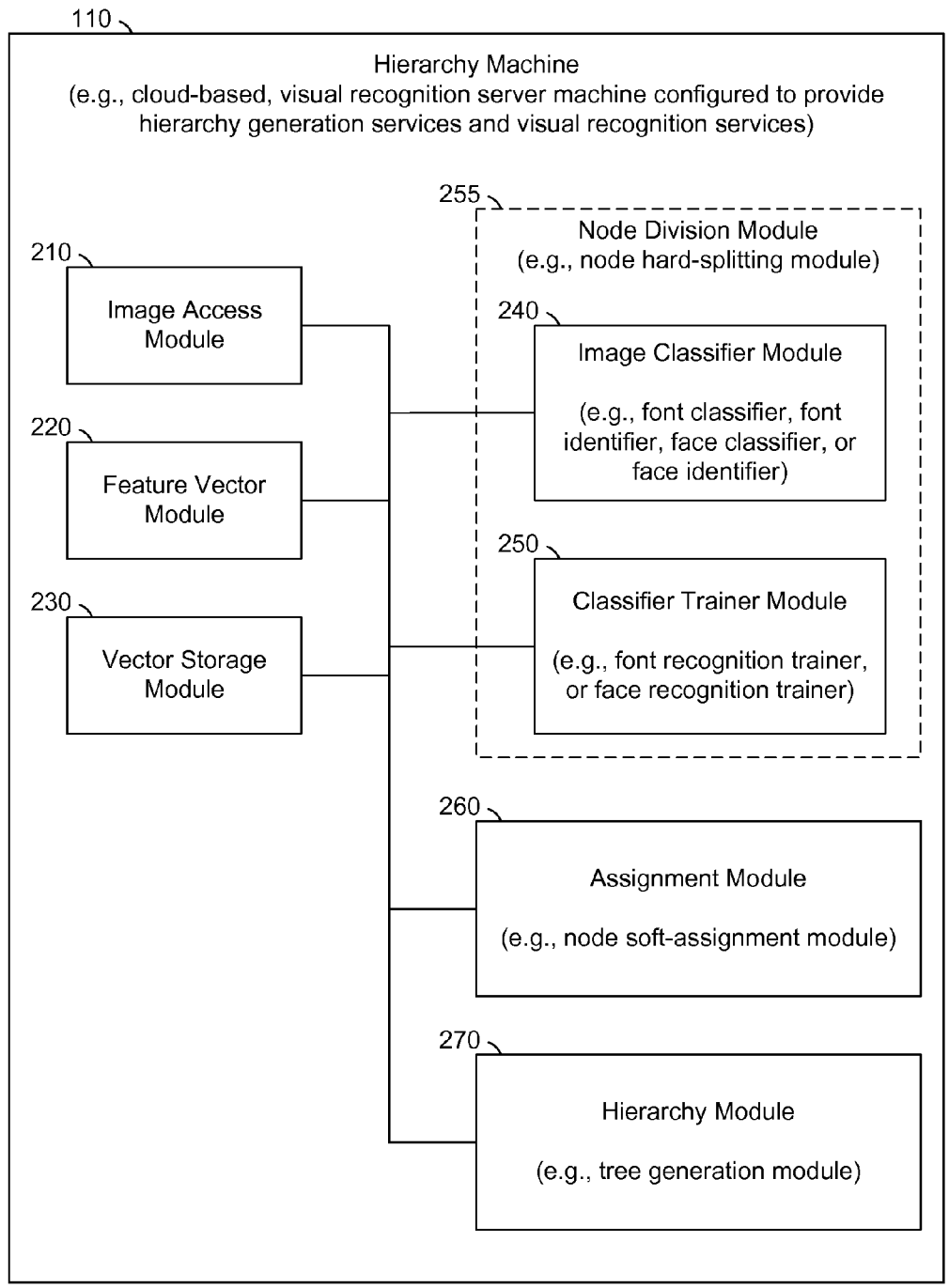
FIG. 2 is a block diagram illustrating components of a hierarchy machine suitable for generating a hierarchy of visual pattern classes, according to some example embodiments.

FIG. 2 is a block diagram illustrating components of the hierarchy machine 110, according to some example embodiments. The hierarchy machine 110 may be a cloud-based server machine (e.g., a hierarchy generation machine for classes of visual patterns, a visual recognition server machine, or any suitable combination thereof) and is shown as including an assignment module 260 (e.g., a node soft-assignment module) and a hierarchy module 270 (e.g., a tree generation module), which may be configured to communicate with each other (e.g., via a bus, shared memory, or a switch). The assignment module 260 may be configured to begin with mutually exclusive child classes that have been split from a parent class, and then remove mutual exclusivity from two or more child classes by adding a visual pattern (e.g., a font, font family, or a category of fonts) to one or more of the child classes, such that multiple child classes each include the visual pattern. The hierarchy module 270 may be configured to generate a hierarchy of classes of visual patterns (e.g., visual pattern classes), based on the output of the assignment module 260. For example, the hierarchy module 270 may generate the hierarchy such that the hierarchy includes the parent class and the mutually nonexclusive child classes (e.g., the child classes from which mutual exclusivity was removed) that each includes the visual pattern or subclass of visual patterns. Further details of the assignment module 260 and the hierarchy module 270 are discussed below with respect to FIG. 7-9.

According to various example embodiments, the hierarchy machine 110 may also include an image access module 210, a feature vector module 220, and a vector storage module 230, which may all be configured to communicate with any one or more other modules of the hierarchy machine 110 (e.g., via a bus, shared memory, or a switch). As shown, the hierarchy machine 110 may further include an image classifier module 240, a classifier trainer module 250, or both. The image classifier module 240 may be or include a font classifier (e.g., typeface classifier), a font identifier (e.g., typeface identifier), a face classifier (e.g., facial expression classifier, facial gender classifier, or both), face identifier (e.g., face recognizer), or any suitable combination thereof. The classifier trainer module 250 may be or include a font recognition trainer (e.g., typeface recognition trainer), a face recognition trainer, or any suitable combination thereof. As shown in FIG. 2, the image classifier module 240 and the classifier trainer module 250 may be configured to communicate with each other, as well as with the image access module 210, the feature vector module 220, and a vector storage module 230. The image classifier module 240, the classifier trainer module 250, or both, may form all or part of a node division module 255 (e.g., a module configured to perform hard-splitting of nodes).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
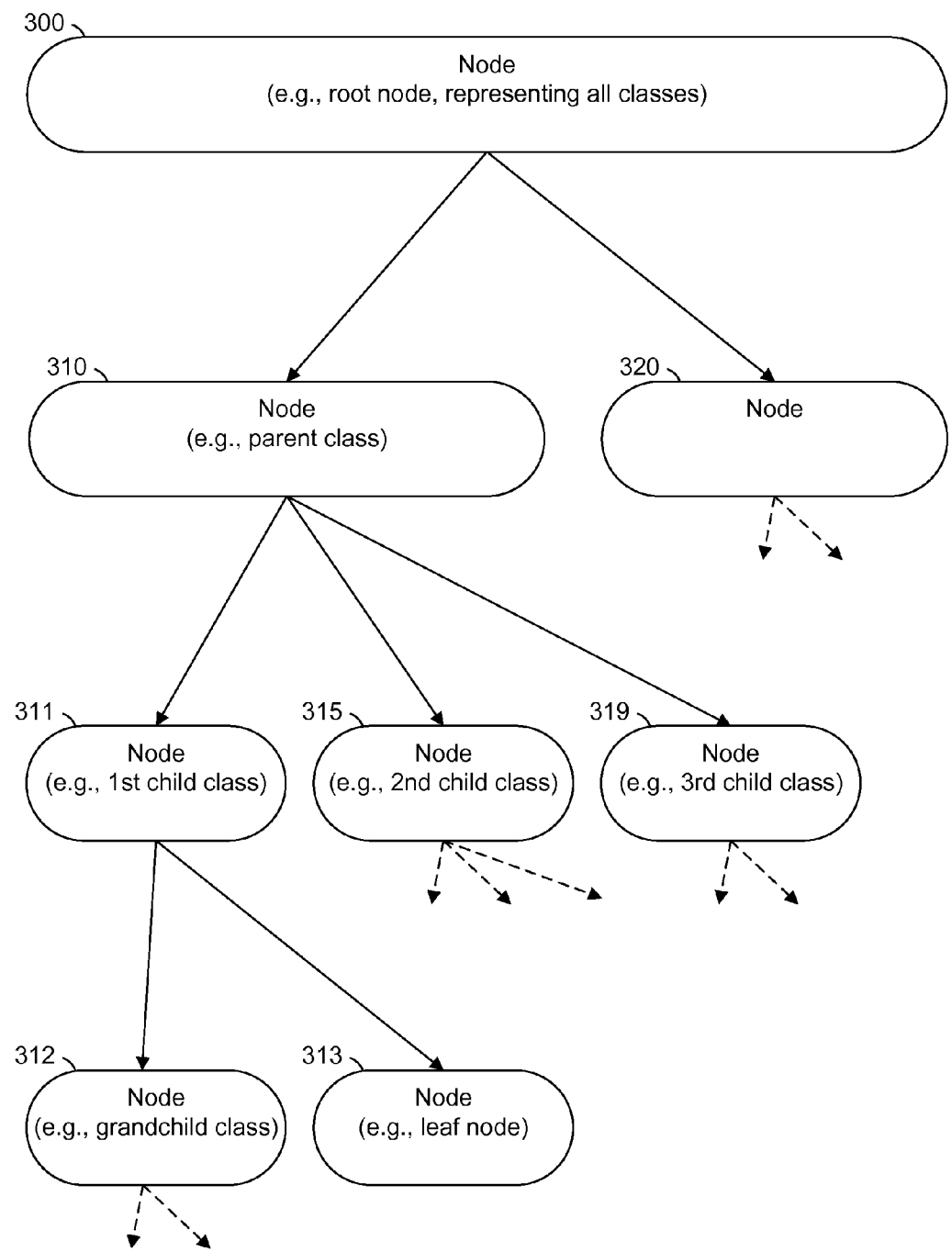
FIG. 3-6 are conceptual diagrams illustrating a hierarchy of visual pattern classes, according to some example embodiments.
Figure 4:
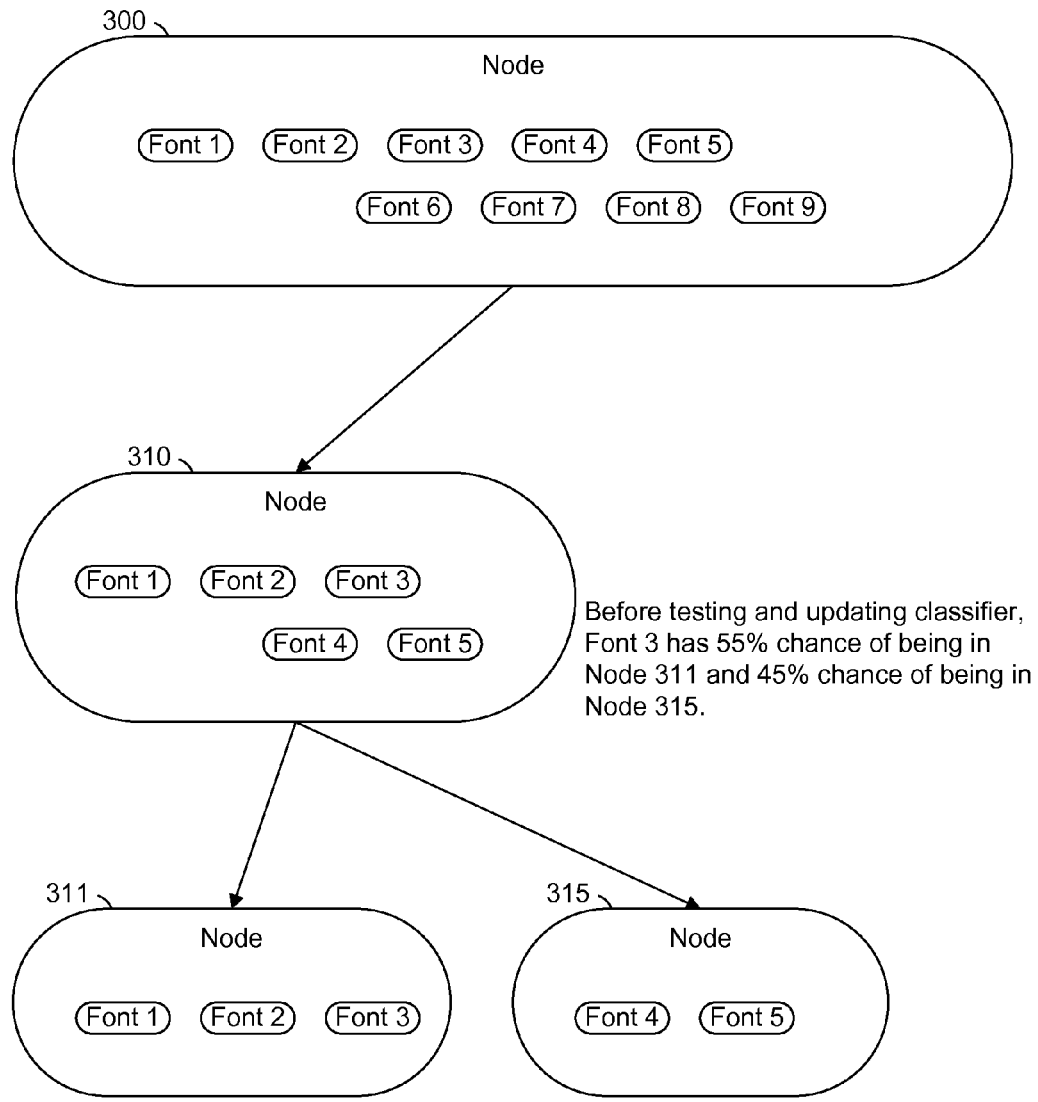
Figure 5:
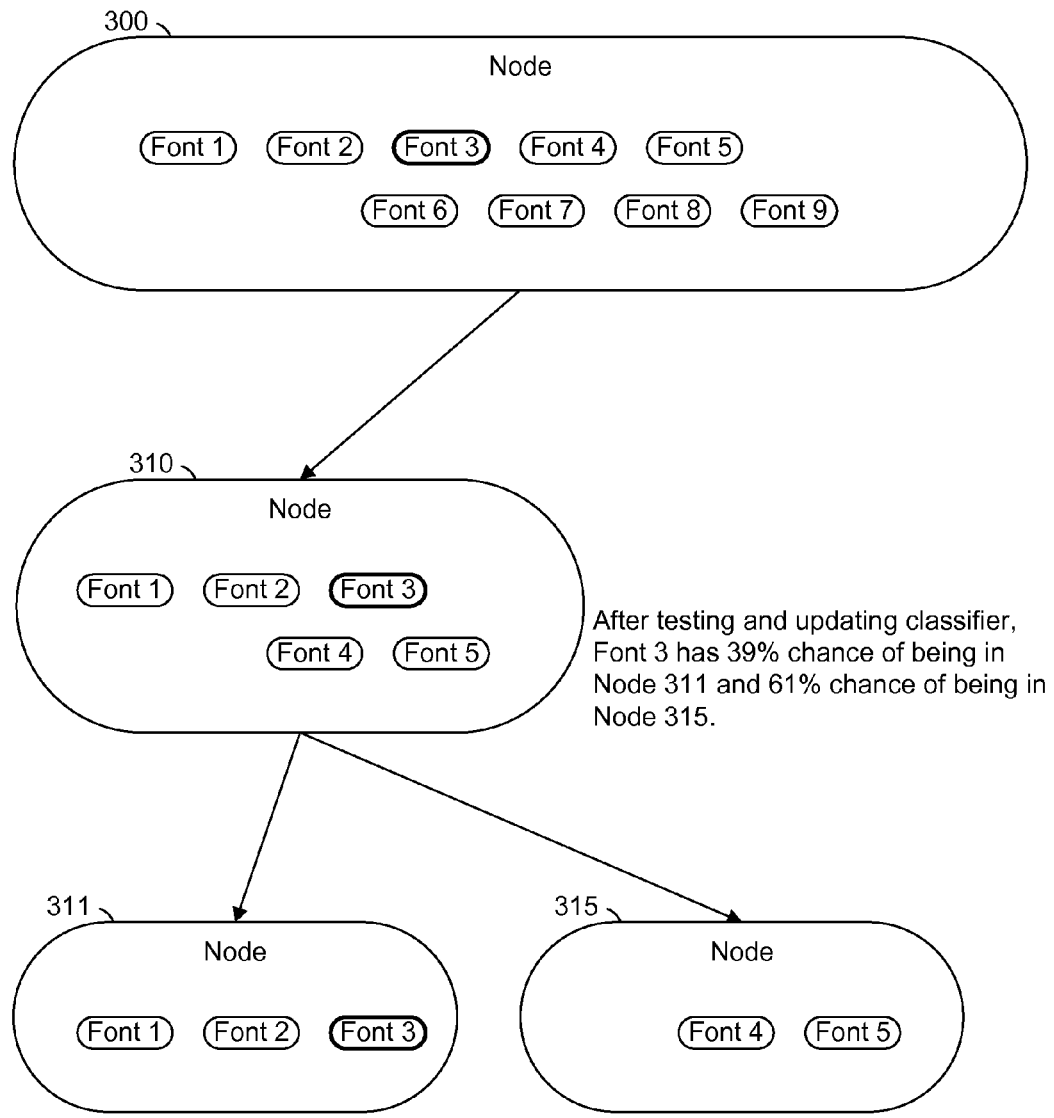
Figure 6:
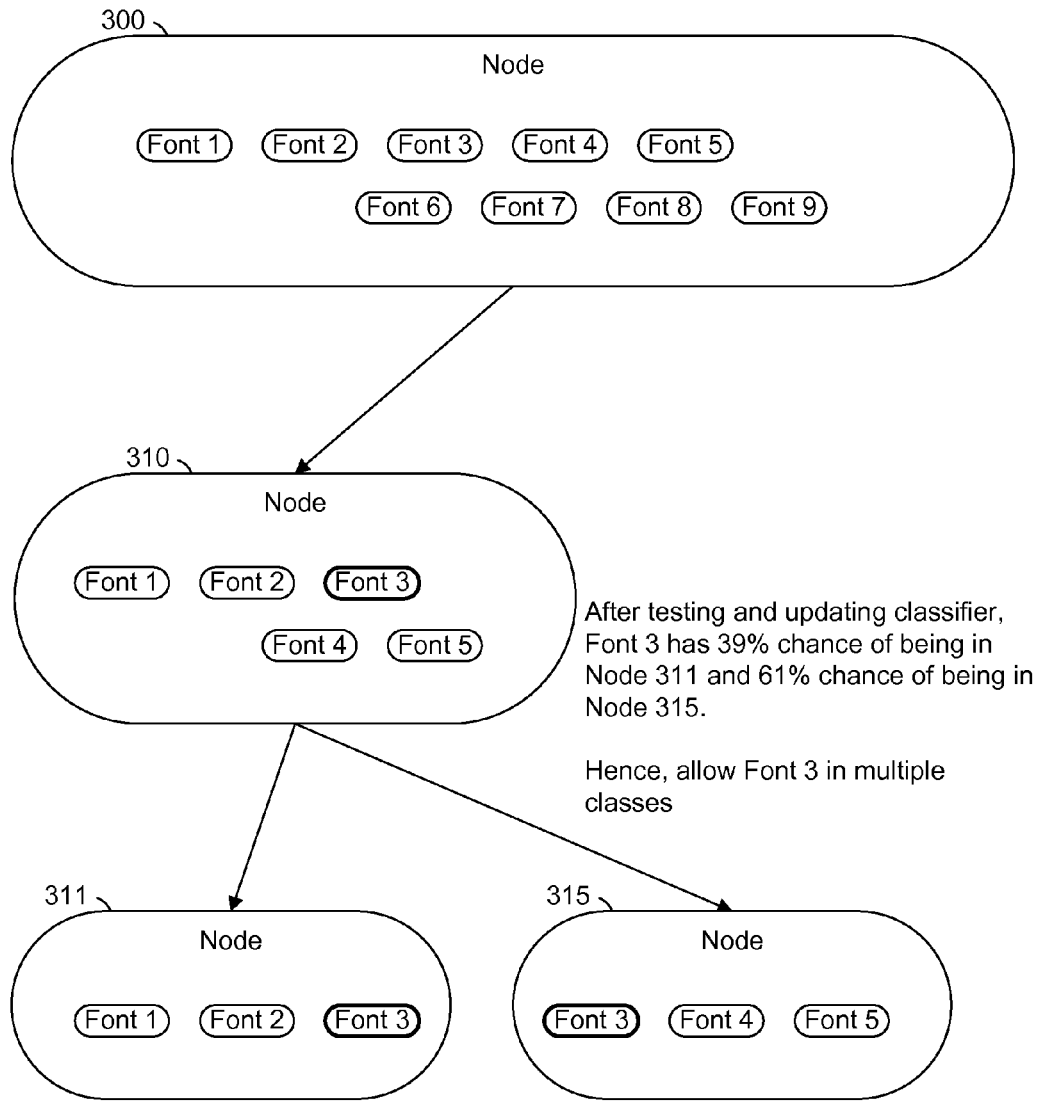

FIG. 3-6 are conceptual diagrams illustrating a hierarchy of visual pattern classes, according to some example embodiments. The hierarchy may be treated as a tree of nodes (e.g., a node tree). In particular, FIG. 3 illustrates examples of structural elements (e.g., nodes) of the hierarchy, while FIG. 4-6 illustrate an example of hard-splitting a parent node (e.g., parent class) into mutually exclusive child classes (e.g., child nodes) and subsequent soft-assignment of a visual pattern (e.g., a font) into child classes from which their initial mutual exclusivity has been removed.

As shown in FIG. 3, the hierarchy includes a node 300 that may be a root node representing all classes of visual patterns that are supported by (e.g., represented within) the hierarchy. These classes may be subdivided into multiple subclasses and sub-subclasses, which may be represented by additional nodes of the hierarchy. As shown in FIG. 3, the classes represented by node 300 may be subdivided among two nodes 310 and 320, with the node 310 representing a portion of the classes represented by the node 300, and the node 320 representing another portion of classes that are represented by the node 300. In general, the nodes 310 and 320 may be mutually exclusive and have nothing in common (e.g., no classes or visual patterns in common). Alternatively, the nodes 310 and 320 may be mutually nonexclusive and include at least one class or visual pattern in common. The node 300 may be considered as a parent of the node 310 and 320, which may be considered children of the node 300.

In a similar manner, the classes represented by the node 310 may be subdivided among multiple nodes 311, 315, and 319, with each of the nodes 311, 315, and 319 strictly or approximately representing a different portion of the classes that are represented by the node 310. For example, the nodes 311, 315, and 319 may be mutually exclusive and have nothing in common. Alternatively, two or more of the nodes 311, 315, and 319 may lack mutual exclusivity and include at least one class or visual pattern in common. The node 310 may be considered as a parent of the nodes 311, 315, 319, which may be considered children of the node 310. As indicated by dashed arrows, the node 320 may also have child nodes.

Likewise, the classes represented by the node 311 may be subdivided among multiple nodes 312 and 313, with each of the nodes 312 and 313 strictly or approximately representing a different portion of the classes that are represented by the node 311. As examples, the nodes 312 and 313 may be mutually exclusive (e.g., having no classes or visual patterns in common) or may be mutually non-exclusive (e.g., both including at least one class or visual pattern shared in common). Thus, the node 311 may be considered as a parent of the nodes 312 and 313, which may be considered as children of the node 311. As indicated by dashed arrows, one or more of the nodes 315 and 319 may have their own child nodes.

In the example shown in FIG. 3, considering the node 310 as a parent node of child nodes 311, 315, and 319, the nodes 312 and 313 may be considered as grandchild nodes of the node 310. As indicated by dashed arrows, the node 312 may have its own child nodes (e.g., great-grandchild nodes of the node 310). Moreover, the node 313 may represent only a single visual pattern (e.g., single font) or a single class of visual patterns (e.g., a single font family). Accordingly, the node 313 may be considered as a leaf node (e.g., in contrast with the root node 300) of the hierarchy (e.g., the node tree).

FIG. 4 illustrates an example of hard-splitting the node 310 into mutually exclusive nodes 311 and 315. As shown, the node 300 (e.g., root node) may be a top-level class of visual patterns, and this top-level class may encompass multiple visual patterns in the example form of fonts (e.g., Font 1, Fonts 2, Font 3, Font 4, Font 5, Font 6, Font 7, Font 8, and Font 9). These fonts may form all or part of a reference set of visual patterns (e.g., a test set of visual patterns with none classifications) that are usable to train one or more classifiers.

Suppose that Fonts 1-5 have been classified (e.g., by a classifier module, such as the image classifier module 240) into the node 310. Using hard-splitting, a classifier (e.g., a classifier that is specific to the node 310) may subdivide (e.g., split, cluster, or otherwise allocate into portions) the node 310 into child nodes, such as the nodes 311 and 315, which may be mutually exclusive (e.g., at least upon this initial subdividing). In the example shown, prior to testing and updating the classifier, the classifier may define a 55% chance of classifying Font 3 into the node 311 and a 45% chance of classifying Font 3 into the node 315. Such probabilities may be stored in a weight vector for the node 310, and this weight vector may be used by (e.g., incorporated into) the classifier for the node 310. Accordingly, Font 3 is shown as being classified exclusively into the node 311, with no representation whatsoever in the node 315.

However, as shown in FIG. 5, there may be some error in that Font 3 may be misclassified into the node 311, instead of the node 315. If the actual proper classification for Font 3 is known (e.g., predetermined) to be the node 315, Font 3 has been misclassified by this initial hard-splitting operation, and the classifier may be improved (e.g., modified or adjusted) such that it is more likely to classify Font 3 into the node 315. In the example shown in FIG. 5, after testing and updating the classifier (e.g., specifically configured to subdivide the node 310), the classifier may define a 39% chance of putting Font 3 in the node 311 and a 61% chance of putting Font 3 in the node 315. Such probabilities may be stored in a modified weight vector for the node 310. In this manner, the classifier can be iteratively improved to produce more accurate subdivisions for visual patterns of known classification (e.g., the reference set of visual patterns).

In this example, though, there is still a chance (e.g., 39%) that a font similar to Font 3 should be classified into the node 311, instead of the node 315. To address this possibility, soft-assignment may be used to allow Font 3 to exist in multiple nodes (e.g., mutually nonexclusive nodes or classes). This situation is shown in FIG. 6. As shown, the mutual exclusivity of the nodes 311 and 315 has been removed by adding Font 3 into the node 315, while maintaining Font 3 in the node 311, as initially allocated by the classifier.

As a result, this combination of hard-splitting and soft-assignment may produce an error-bounded hierarchy (e.g., tree) of nodes. This error-bounded hierarchy may be used to facilitate visual pattern recognition, for example, by omitting unrelated classifiers and executing only those classifiers with at least a threshold probability of actually classifying a candidate visual pattern (e.g., a font of unknown classification or identity). This benefit can be seen by reference to FIG. 6. Using the hierarchy shown, recognition of Font 1 would involve three or four executions of classifiers (e.g., one to subdivide the node 300, one to subdivide the node 310, and one or two to isolate Font 1 from Fonts 2 and 3 in the node 311). Without the hierarchy, between one and eight executions of classifiers would be used to isolate Font 1 from the other eight Fonts 1-8. With large numbers of visual patterns (e.g., thousands of fonts), the use of such an error-bounded hierarchy may be part of an efficient and scalable solution for automated visual pattern recognition.

Figure 7:
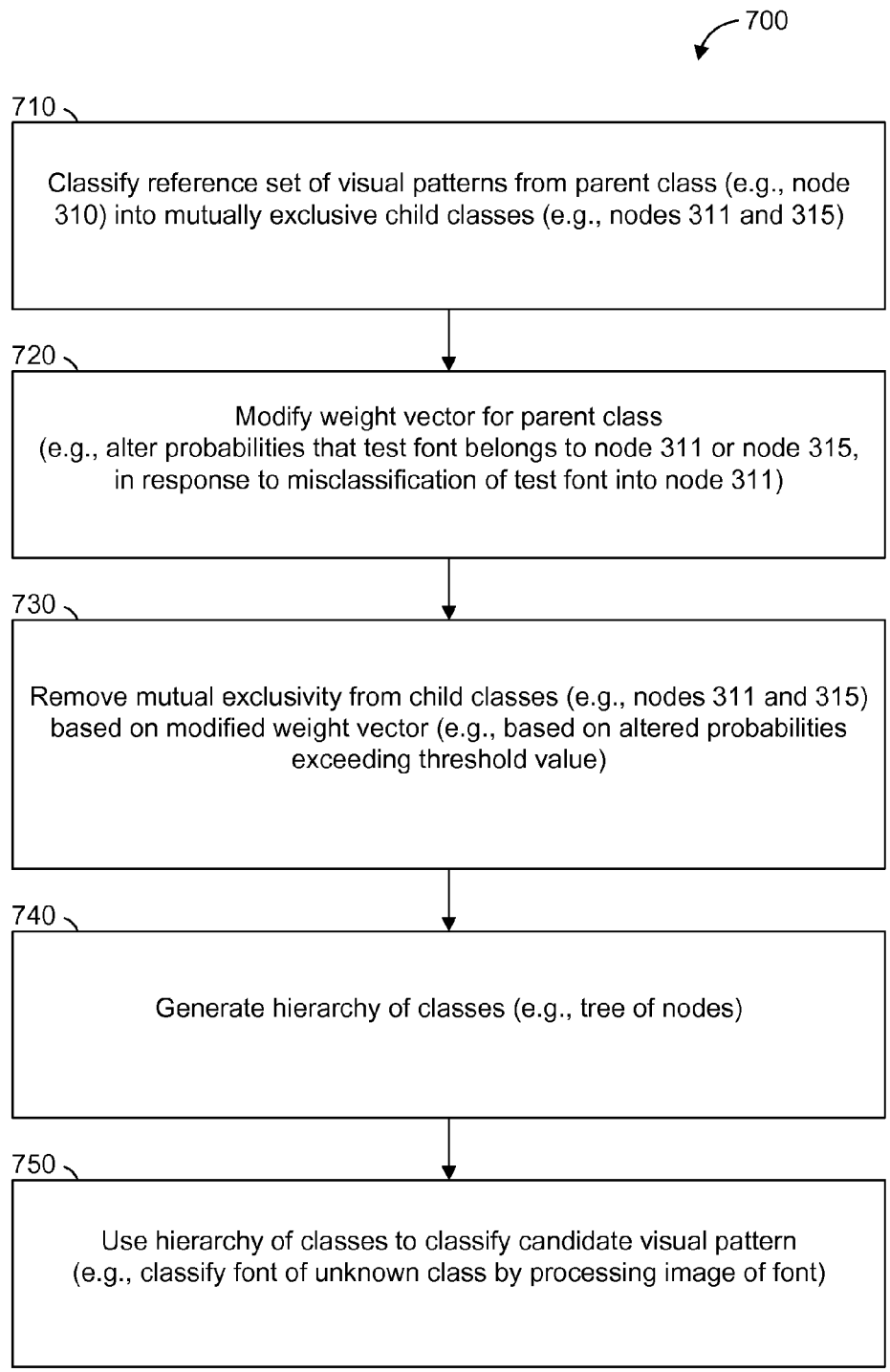
FIG. 7-9 are flowcharts illustrating operations of the hierarchy machine in performing a method of generating the hierarchy of visual pattern classes, according to some example embodiments.
Figure 8:
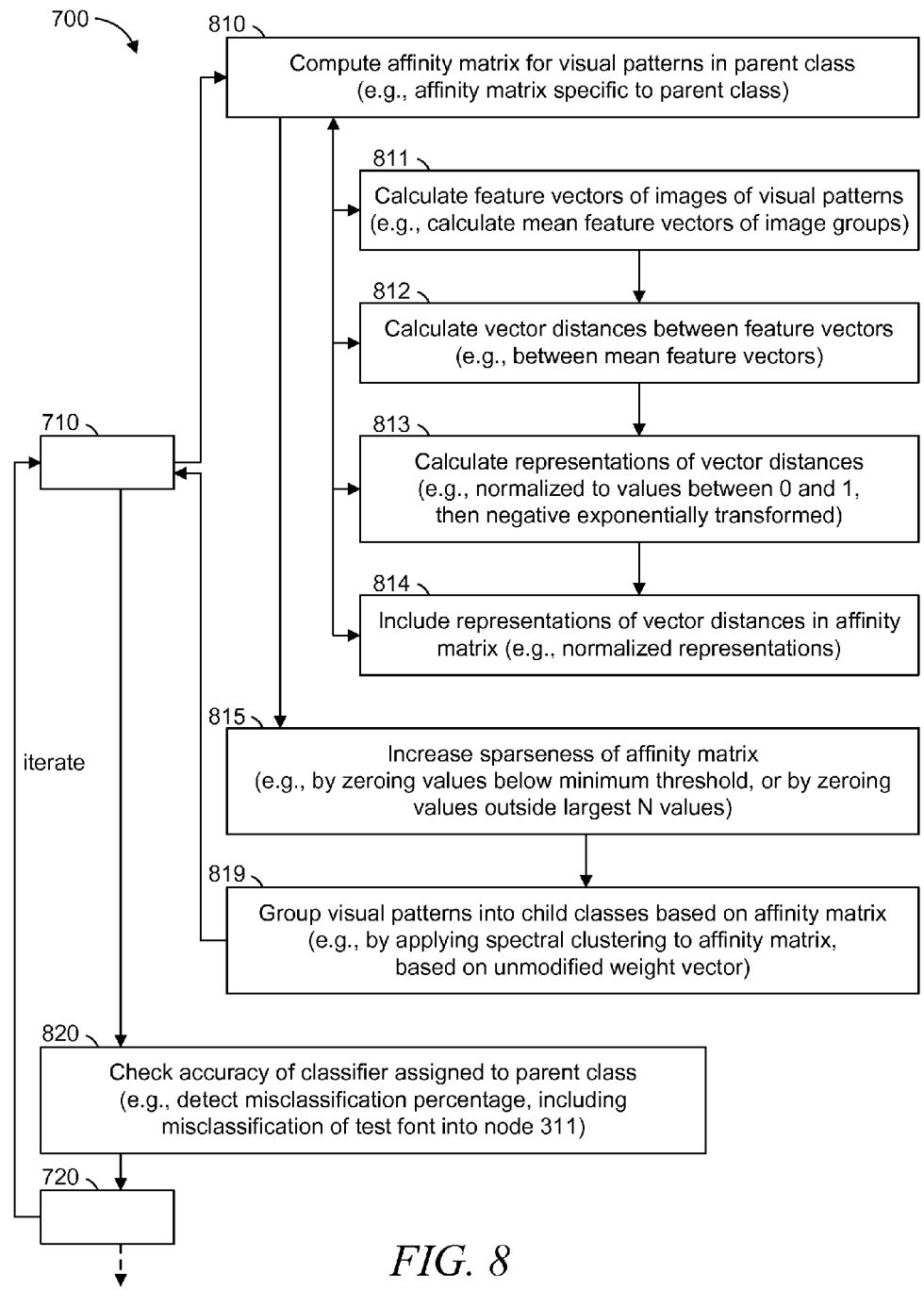
Figure 9:
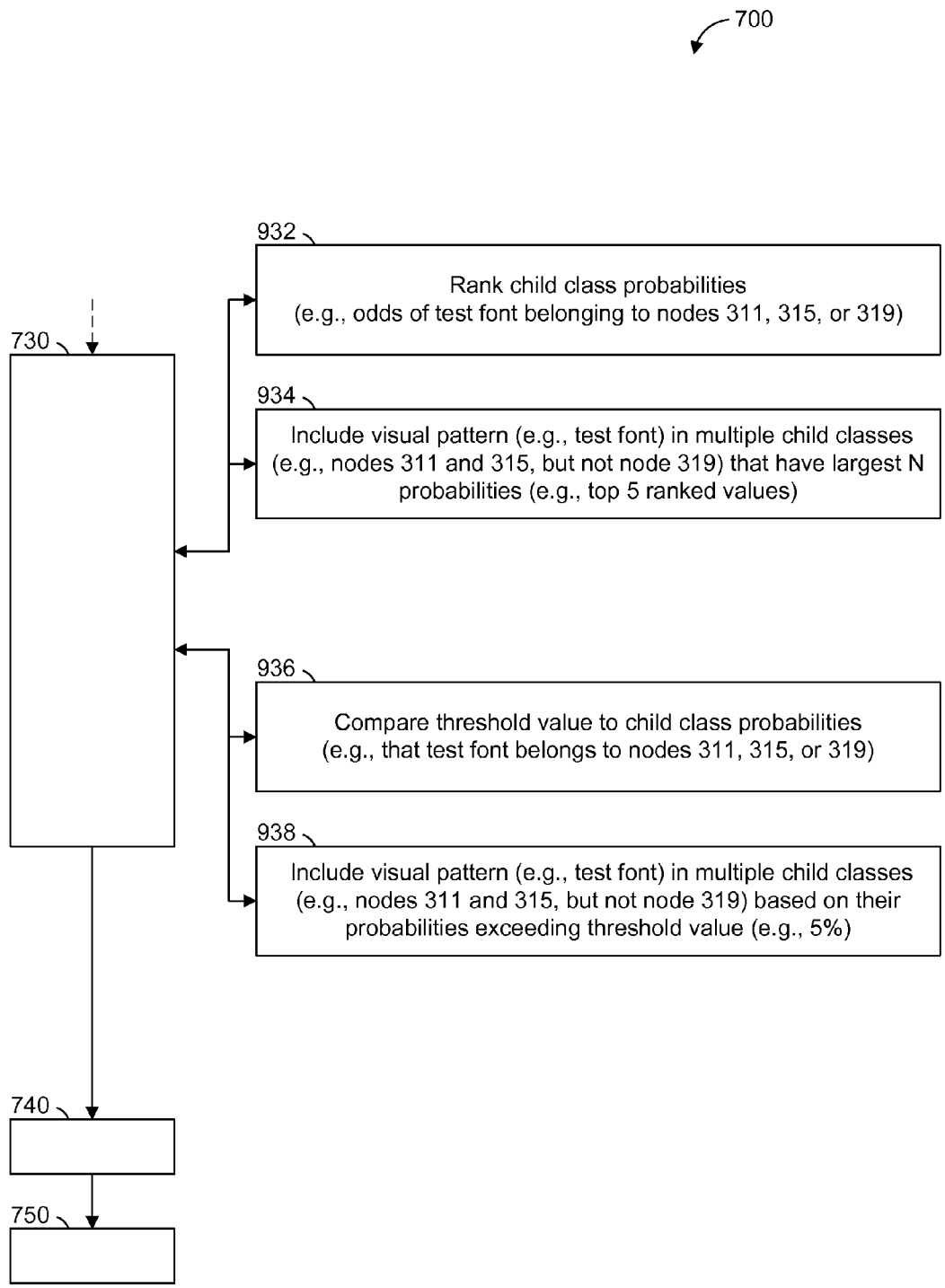

FIG. 7-9 are flowcharts illustrating operations of the hierarchy machine 110 in performing a method 700 of generating the hierarchy of visual pattern classes, according to some example embodiments. Operations in the method 700 may be performed using modules described above with respect to FIG. 2. As shown in FIG. 7, the method 700 may include one or more of operations 710, 720, 730, 740, and 750.

In operation 710, the image classifier module 240 classifies a reference set of visual patterns (e.g., a test set of fonts, such as Fonts 1-9 illustrated in FIG. 4-6, which fonts may be stored in the database 115) that belong to a parent class (e.g., node 310). The image classifier module 240 may classify this reference set into mutually exclusive child classes (e.g., nodes 311 and 315, as shown in FIG. 4). For example, such mutually exclusive child classes may include a first child class (e.g., node 311) and a second child class (e.g., node 315). In some example embodiments, the mutually exclusive child classes include a third child class (e.g., node 319). As noted above with respect to FIG. 5, a visual pattern from the reference set (e.g., Font 3) may be classified (e.g., misclassified) into the first child class (e.g., node 311) instead of the second child class (e.g., node 315). This may have the effect of hard-splitting the parent class (e.g., node 310).

In operation 720, the classifier trainer module 250 modifies a weight vector that corresponds to the parent class (e.g., node 310). The modification of this weight vector may be in response to testing the accuracy of the hard-splitting performed in operation 710 and detection of any errors in classification. In other words, operation 720 may be performed in response to the visual pattern being misclassified into the first child class (e.g., node 311) instead of the second child class (e.g., node 315). For example, the modified weight vector may alter a first probability that the visual pattern belongs to the first child class (e.g., from 55% to 39%), and alter a second probability that the visual pattern belongs to the second child class (e.g., from 45% to 61%).

In operation 730, the assignment module 260, based on the altered probabilities, removes mutual exclusivity from the first and second child classes (e.g., nodes 311 and 315). For example, mutual exclusivity may be removed by adding the visual pattern to the second child class (e.g., node 315), so that both the first and second child classes include the visual pattern (e.g., a test font) and share it in common. According to various example embodiments, operations similar to operations 710-730 may be performed for any one or more additional classes to be included in the hierarchy. As an example, the first child class (e.g., node 311) may be subdivided into multiple grandchild classes (e.g., nodes 312 and 313) in a manner similar to the hard-splitting and soft-assignment described above for the parent class (e.g., node 310). Thus, where performance of operation 710 assigns a portion of the reference set of visual patterns to the first child class (e.g., node 311), a similar operation may classify this portion of the reference set into such grandchild classes (e.g., nodes 312 and 313).

In operation 740, the hierarchy module 270 generates a hierarchy of classes of visual patterns (e.g., an error-bounded tree of nodes that each represent the classes of visual patterns). In particular, the hierarchy module 270 may include the parent class (e.g., node 310) and the now mutually non-exclusive first and second child classes (e.g., nodes 311 and 315) that now each include the visual pattern.

In operation 750, the image classifier module 240 uses the generated hierarchy of classes to classify a candidate visual pattern (e.g., a font of unknown class or identity) by processing one or more images of the candidate visual pattern (e.g., an image of text rendered in the font). For example, the image classifier module 240 may traverse the hierarchy of classes, which may have the effect of omitting unrelated classifiers and executing only those classifiers with at least a minimum threshold probability of properly classifying a candidate visual pattern.

As shown in FIG. 8, the method 700 may include one or more of operations 810, 815, 819, and 820. One or more of operations 810, 815, and 819 may be performed as part (e.g., a precursor task, a subroutine, or a portion) of operation 710, in which the image classifier module 240 classifies the reference set of visual patterns. In operation 810, the image classifier module 240 computes an affinity matrix that quantifies similarity between or among the visual patterns. For example, the computed affinity matrix may quantify degrees to which the visual patterns are similar to each other. Moreover, the affinity matrix may be specific to the parent class (e.g., node 310) undergoing the hard-splitting discussed above with respect to operation 710. That is, each class (e.g., parent class) undergoing hard-splitting may have its own affinity matrix. Hence, according to various example embodiments, the image classifier module 240 may be or include a classifier that is assigned specifically to the parent class (e.g., node 310), and this classifier may include the weight vector (e.g., modified or unmodified) discussed above with respect to operation 720.

In operation 815, the image classifier module 240 increases sparseness of the affinity matrix calculated in operation 810 (e.g., makes the affinity matrix more sparse than initially calculated). In some example embodiments, this may be done by zeroing values of the affinity matrix that are below a minimum threshold value. In certain example embodiments, this may be done by zeroing values that fall outside the largest N values of the affinity matrix (e.g., values that lie outside the top 10 values or top 20 values). In some example embodiments, the values in the affinity matrix are representations of the vector distances between visual patterns. Hence, in some example embodiments, operation 815 may be performed by setting one or more of such representations to zero based on those representations falling below a minimum threshold value. Similarly, in certain example embodiments, operation 815 may be performed by setting one or more of such representations to zero based on those representations falling outside the top N largest representations.

In operation 819, the image classifier module 240 groups the visual patterns into the mutually exclusive child classes (e.g., nodes 311 and 315) discussed above with respect to operation 710. For example, this grouping may be performed by applying spectral clustering to the affinity matrix computed in operation 810. According to some example embodiments, the increased sparseness from operation 815 may have the effect of reducing the number of computations involved, thus facilitating efficient performance of operation 819.

As shown in FIG. 8, one or more of operations 811, 812, 813, 814 may be performed as part of operation 810, in which the affinity matrix is computed. In operation 811, the image classifier module 240 calculates feature vectors of images of the visual patterns in the reference set. These images may be accessed from the database 115. For example, the image classifier module 240 may access an image that depicts a particular visual pattern (e.g., Font 3, as discussed above with respect to FIG. 4-6), and the image classifier module 240 may calculate a feature vector of this image. An example of a feature vector being calculated is discussed below with respect to FIG. 10-15. As discussed below with respect to FIG. 10-15, the calculating of a feature vector may be performed using LFE, such that the resulting feature vector has one or more locally embedded features.

In addition, according to some example embodiments, performance of operation 811 may further calculate mean feature vectors that each represent groups of images depicting the visual patterns in the reference set. For example, there may be nine fonts (e.g., Fonts 1-9, as discussed above with respect to FIG. 4-6), and each font may be depicted in 100 images of various numerals, letters, words or phrases rendered in that font. In such a case, performance of operation 811 may include calculating nine mean feature vectors, where each mean feature vector represents one of the nine fonts.

In operation 812, the image classifier module 240 calculates vector distances between or among two or more of the feature vectors calculated in operation 811. Continuing the above example, such vector distances (e.g., Mahalanobis distances) may be calculated among the nine mean feature vectors that respectively represent the nine fonts (e.g., Fonts 1-9, as discussed above with respect to FIG. 4-6). This may have the effect of calculating vector distances between the visual patterns in the reference set (e.g., with the visual patterns being represented by their respective mean feature vectors).

In operation 813, the image classifier module 240 calculates representations of the vector distances for inclusion in the affinity matrix. For example, the vector distances may be normalized to values between zero and one (e.g., to obtain relative indicators of similarity between the visual patterns). As another example, the vector distances may be normalized by calculating a ratio of each vector distance to the median value of the vector distances. As a further example, normalization of the vector distances may be performed by calculating a ratio of each vector distance to the median value of the vector distances. According to various example embodiments, an exponential transform may be taken of the negative of these normalized values (e.g., such that the normalized values are negative exponentially transformed). Thus, such representations of the vector distances may be prepared for inclusion in the affinity matrix and subsequent spectral clustering.

In operation 814, the image classifier module 240 includes the representations of the vector distances into the affinity matrix. As noted above, these representations may be normalized, negative exponentially transformed, or both.

In operation 820, the image classifier module 240 checks its accuracy against the known (e.g., predetermined) classifications of the reference set of visual patterns. This may involve detecting one or more misclassifications and calculating a percentage of misclassifications (e.g., as an error rate from classifying the reference set in operation 710). Continuing the above example, if Font 3 is the only misclassified font among the nine fonts (e.g., Fonts 1-9), the detected misclassification percentage would be 11%. Based on this calculated percentage, the method 700 may flow on to operation 720, as described above with respect to FIG. 7. That is, operation 720 may be performed in response to the percentage calculated in operation 820.

As shown in FIG. 8, after the weight vector is modified in operation 720, the method 700 may iterate back to operation 710, in which the image classifier module 240 performs the classification of the reference set of visual patterns, this time with the modified weight vector. In some example embodiments, the method 700 may include iterating operations 710, 820, and 720 until the misclassification percentage falls below a threshold value (e.g., a maximum allowable error percentage for misclassifications). Accordingly, the initial performance of operation 710 may be described as being performed with the unmodified weight vector, while subsequent performances of operation 710 are performed with the modified weight vector (e.g., modified at least once by performance of operation 720).

As shown in FIG. 9, one or more of operations 932, 934, 936, and 938 may be performed as part of operation 730, in which the assignment module 260 removes mutual exclusivity from the first and second child classes (e.g., nodes 311 and 315) and performs the soft-assignment functions discussed above with respect to operation 730. In operation 932, the assignment module 260 compares probabilities that the visual pattern (e.g., the test font) belongs to one or more of the child classes (e.g., node 311, 315, or 319) subdivided from the parent class (e.g., node 310) and ranks the probabilities (e.g., orders the probabilities by their values).

In operation 934, the assignment module 260 includes the visual pattern (e.g., the test font) in multiple child classes based on the probabilities ranked in operation 932 (e.g., allocates the visual pattern into the multiple child classes based on at least one of the probabilities). For example, supposing that there is a 39% first probability of the visual pattern belonging to the first child class (e.g., node 311), a 61% second probability of the visual pattern belonging to the second child class (e.g., no 315), and a 3% third probability that the visual pattern belongs to a third child class (e.g., node 319), the assignment module 260 may apply a rule that only the top two probabilities will be considered. Accordingly, the visual pattern may be included into the nodes 311 and 315, but not the node 319, based on the first and second probabilities being the top two probabilities and the third probability falling outside this subset. Hence, operation 730 may be performed based on the first and second probabilities being among a predetermined subset of largest probabilities, based on the third probability falling outside of the predetermined subset of largest probabilities, or based on any suitable combination thereof.

In alternative example embodiments, operations 936 and 938 are used instead of operations 932 and 934. In operation 936, the assignment module 260 compares the probabilities discussed above with respect to operations 932 and 934 to a threshold minimum value (e.g., 10%). In operation 938, the assignment module 260 includes the visual pattern (e.g., the test font) in multiple child classes based on these probabilities in comparison to the minimum threshold value (e.g., allocates the visual pattern into the multiple child classes based on a comparison of at least one of the probabilities to the minimum threshold value). For example, supposing that there is a 39% first probability of the visual pattern belonging to the first child class (e.g., node 311), a 61% second probability of the visual pattern belonging to the second child class (e.g., no 315), and a 3% third probability that the visual pattern belongs to a third child class (e.g., node 319), the assignment module 260 may apply a rule that only the probabilities above the minimum threshold value (e.g., 10%) will be considered. Accordingly, the visual pattern may be included into the nodes 311 and 315, but not the node 319, based on the first and second probabilities exceeding the minimum threshold value and the third probability failing to exceed this minimum threshold value. Hence, operation 730 may be performed based on the first and second probabilities exceeding the minimum threshold value, based on the third probability falling below the predetermined minimum threshold value, or based on any suitable combination thereof.

As noted above, the two-stage procedure performed by the hierarchy machine 110 may include (1) hard-splitting of nodes (e.g., representing font classes or individual fonts) and (2) soft-assignment of nodes to obtain an error-bounded tree in which nodes are allocated into hierarchical clusters. To illustrate hard-splitting of nodes, an illustrative example is presently explained in detail.

Suppose there are N font classes total in a current node i. The task is to assign these N fonts into C child nodes. In hard-splitting of nodes, each font class is assigned into exactly one child node. That is, the child nodes contain no duplicate font classes.

To calculate the distances between font classes, the hierarchy machine 110 may be configured to use LFE to represent each font image: $f=\{(z_k, x_{e_k})\}_{k=1}^{K}$, where K is the codebook size, $z_k$ is pooling coefficient of the k-th code, and $x_{e_k}$ represents the pooled local descriptor vector. Further details of LFE are provided below. Based on LFE-represented features, a mean vector $\mu_k^c$ for each font class may be computed as:

$$\mu_k^c = \frac{1}{Z^c} \sum_{i \in I_c} z_k^i x_{e_k}^i, \qquad (1)$$

and the hierarchy machine 110 may also calculate a within-class covariance matrix over all font classes, denoted by $\Sigma_k$.

So now each font class may be represented as $\{(\mu_k^c, \Sigma_k)\}_{k=1}^{K}$. After this, the distance between each pair of fonts may be defined as:

$$d(c_1, c_2) = \sum_{k=1}^{K} w_k d_M(\mu_{c_1}^k, \mu_{c_2}^k), \qquad (2)$$

where $d_M(\mu_{c_1}^k, \mu_{c_2}^k) = \|\mu_k^{c_1} - \mu_k^{c_2}\|_{\Sigma_k}^2$ is the Mahalanobis distance between the template mean vectors $\mu_k^{c_1}$ and $\mu_k^{c_2}$, while $w_k$ is the weight to incorporate the importance of the k-th template. If the k-th template is more effective than other templates in separating the fonts, the system may assign it a larger weight. Initially the importance of the templates is unknown, so the hierarchy machine 110 may be configured to set all $w_k=1/C$ at first.

A sparse affinity matrix (e.g., an affinity matrix having increased sparseness) may be obtained next. After defining distances between font classes, the hierarchy machine 110 may build a distance matrix D with element $d_{ij}=d(c_i,c_j)$ and an affinity matrix A with elements expressed as: $A_{ij}=\exp(-d(c_i, c_j)/\sigma)$, where $\sigma$ is the scaling parameter. The affinity matrix A may be symmetric, and its diagonal elements may all be zero. According to various example embodiments, the meaning of matrix A is: the higher value of $A_{ij}$, the more similar are the corresponding two fonts $c_i$ and cj.

With the full (e.g., non-sparse) affinity matrix A, the hierarchy machine 110 could use one or more classic clustering algorithms to cluster these fonts. In some example embodiments, the hierarchy machine 110 is configured to use spectral clustering to cluster the fonts. Supposing that these N fonts are to be clustered into K clusters, the steps for spectral clustering are:

1. Compute the diagonal matrix T with elements expressed as $T_{ii}=\Sigma_{j=1}^{N} A_{ij}$.
2. Compute the normalized Laplacian matrix: $L=T^{-1/2}(T-A)T^{(1/2)}$.
3. Compute and sort eigenvalues of matrix L in descending order: $\lambda_i \geq \lambda_i+1$, i=1, n?1.
4. Form a normalized matrix S using C largest eigenvectors.
5. Treating each row of S as a data point, cluster all the data points by K-means with cluster number C.

However, in certain example embodiments, clustering on a full affinity matrix A may be non-stable and thus poorly performed. Moreover, clustering may be quite sensitive to parameter $\pi$. Without a carefully-tuned $\pi$, the clustering may be unsuccessful. Consequently, a bad clustering operation may cause a font classification algorithm (e.g., an LFE-based algorithm) to fail. To solve these problems, the hierarchy machine 110 may be configured to perform operations that return stable and appropriate clustering results. For example, such operations may include the following:

1. Normalize the distance matrix D by dividing each element $d_{ij}$ by the median value d of matrix elements in D, i.e., $d=\text{median}(d_{ij})$.
2. Keep only the distance values of q-nearest fonts for each font. The distance with far fonts are set as inf. The parameter q may be chosen in this way: suppose there are total N font classes, if they are to be split into C clusters, then q=N/C.
3. Now the affinity matrix A is a sparse matrix. Note that the scaling parameter may be a fixed value of $\sigma=1$ (e.g., due to the normalization in step 1).

4. Make the affinity matrix A symmetric:

$$A \leftarrow \frac{1}{2}(A + A^T).$$

5. Finally, perform a spectral clustering algorithm on matrix A (e.g., as before).

In some example embodiments, the sparse affinity matrix works well compared to a self-tuning spectral clustering algorithm (e.g., much better and more stable). Moreover, there are no sensitive parameters, and parameter tuning may thus be avoided. This feature may be important for tree construction. Note that the above step 1 uses the median, not the mean, since from a statistical viewpoint, the median may be more stable than the mean.

Discriminative classification clustering may be implemented by the hierarchy machine 110. As mentioned above, the hierarchy machine 110 may factor in the importance weight $w_k$ when computing the font distance $d(c_1,c_2)$ in Equation 2. As discussed in detail below, training an LFE-based classifier may involve performing a template selection step and assigning a weight to each template feature. Templates that are better at classifying different fonts would be given more weight (e.g., larger weight value). In some example embodiments, this weight is used by the system as the importance weight $w_k$. In certain example embodiments, the hierarchy machine 110 initially sets $w_k=1/C$ and performs clustering on all fonts. After clustering N fonts into C clusters, the hierarchy machine 110 may treat each cluster as a new class and train the LFE-based classifier to classify these classes and get the weights $w_k$. Having obtained $w_k$, the hierarchy machine 110 may re-compute the distances between the font classes. Then the hierarchy machine 110 may obtain a new sparse affinity matrix and perform clustering again. This procedure may be repeated to get better clustering results. The algorithm steps may be expressed as the following operations:

1. Set all $w_k=1/C$, and perform the clustering algorithm discussed above.
2. Generate LFE-based feature vectors for the fonts (e.g., for images depicting the font), and obtain a set of importance weights $\{w_k\}$ (e.g., as a weight vector stored as a template). Then evaluate the accuracy of the current classification.
3. Based on the new template weights $\{w_k\}$, perform clustering again.
4. Repeat steps 2 and 3 until the classification performance (e.g., accuracy) converges.

According to various example embodiments, this discriminative classification clustering works well and iteratively improves classification performance (e.g., of an LFE-based classifier). Convergence may occur within 4 or 5 iterations.

As noted above, after hard-splitting nodes (e.g., representing font classes or individual fonts), the hierarchy machine 110 may perform soft-assignment of nodes to obtain an error-bounded tree in which nodes are allocated into hierarchical clusters. After hard-splitting, each font is assigned to one class (e.g., each font or font class in the node i only belongs to one child node). However, errors may propagate during tree growth. Suppose that after hard-splitting, the hierarchy machine 110 has assigned the fonts in a parent node into child nodes, and thus the hierarchy machine 110 may train an LFE-based classifier $f_i$ to classify a test font (e.g., font of known classification or identity) by determining to which child node it belongs. So if the test font is misclassified by $f_i$, then it will fall into the wrong child node, and this test font would never find its true font class (e.g., font label) in subsequent steps. If error of $f_i$ is denoted as $\epsilon_i$, then in this node layer, the classification accuracy is upper-bounded by $1-\epsilon_i$. The problem of error propagation may worsen when a node tree has multiple layers. This worsening of error propagation may characterize hierarchical algorithms.

To illustrate error propagation, suppose a tree has M layers, and a node layer i has upper-bounded classification accuracy $1-\epsilon_i$. Then the upper-bounded classification rate of the whole tree may be expressed as $\Pi_{i=1}^{M}(1-\epsilon_i)$. Suppose M=3, and $\epsilon_i=0.15$. Then best classification accuracy of this tree would be bounded by 0.614. In practice, $\epsilon_i$ may be much larger than 0.15. Thus, this error propagation problem may be quite serious.

To solve this error propagation problem, the hierarchy machine 110 may implement a method to perform soft-assignment of nodes, which may also be called error-bounded node splitting. After performing the hard-splitting method introduced above to get an initial splitting, and after training a classifier (e.g., an LFE-based classifier module) for a given node i, the hierarchy machine 110 may assign one or more visual patterns into multiple child nodes, based on the classification accuracy of each font class. To illustrate, imagine that a font class j is supposed to belong to a child node $c_i$. However, tests may indicate that a test font that represents font class j could fall into more child nodes $\{c_l, c_{l+1}, c_{l+2}, \ldots, c_L\}$. In such a case, the hierarchy machine 110 may compute the probability that the test data for font class j falls into these child nodes $\{p_l, p_{l+1}, p_{l+2}, p_L\}$. The hierarchy machine 110 then may select the top R child nodes $\{c_r, c_{r+1}, c_R\}$ with the highest probability such that the summation of the probability is larger than a pre-set threshold: $\Sigma_{r=1}^{R} p_r \geq \theta$. Then, the hierarchy machine 110 may assign this font class into the child nodes $\{c_r, c_{r+1}, c_R\}$.

Accordingly, the hierarchy machine 110 may ensure that the classification accuracy of each font in this node i is at least $\theta_i$. Thus, the hierarchy machine 110 may bound the error rate of each node to less than $1-\theta_i$. As a result, the upper-bound classification rate of the entire tree would be $\Pi_{i=1}^{M}\theta_i$. In some example embodiments, the hierarchy machine 110 may be configured to use $\theta_i=0.95$ or higher, so that, if M=3, the upper-bounded classification accuracy of the tree would be 0.857, which would be much higher than without using this soft-assignment technique.

The time used by the hierarchy machine 110 for font class soft-assignment may depend on the average number of child nodes into which each font class is softly assigned. In general, if a font class is assigned into too many child nodes, the computation complexity is increased, potentially to impractical levels. In certain example embodiments, the hierarchy machine 110 may be configured to perform soft-assignment of font classes into an average assignment ratio of 2.2 to 3.5 nodes, which may only slightly burden the computation.

Together, the hard-splitting of nodes and the soft-assignment of nodes may result in error-bounded splitting of nodes into clusters, which may also be called error-bounded tree construction. Suppose there are N font classes total, and the root node of the tree has C child nodes. Then the above-described hard-splitting technique may be used by the system to assign the N fonts into C child nodes. Subsequently, the hierarchy machine 110 may use the above-described soft-assignment technique to reassign the N fonts into C child nodes with certain error bounds, denoting the average assignment ratio for each font as R. Thus, each child node i contains on average $N_i=RN/C$ font classes. Then, for a given child node i, the hierarchy machine 110 may continue to split it by dividing its $N_i$ font classes into $C_i$ children. Following the same procedure, the hierarchy machine 110 may build up a hierarchical error-bounded tree of nodes. In some example embodiments, the hierarchy machine 110 builds a 2-layer tree in which the first layer contains the C child nodes of the root node, and in which each child node has a certain number of fonts. In such example embodiments, the second layer may contain leaf nodes such that each node in the second layer only contains one font class.

Figure 10:
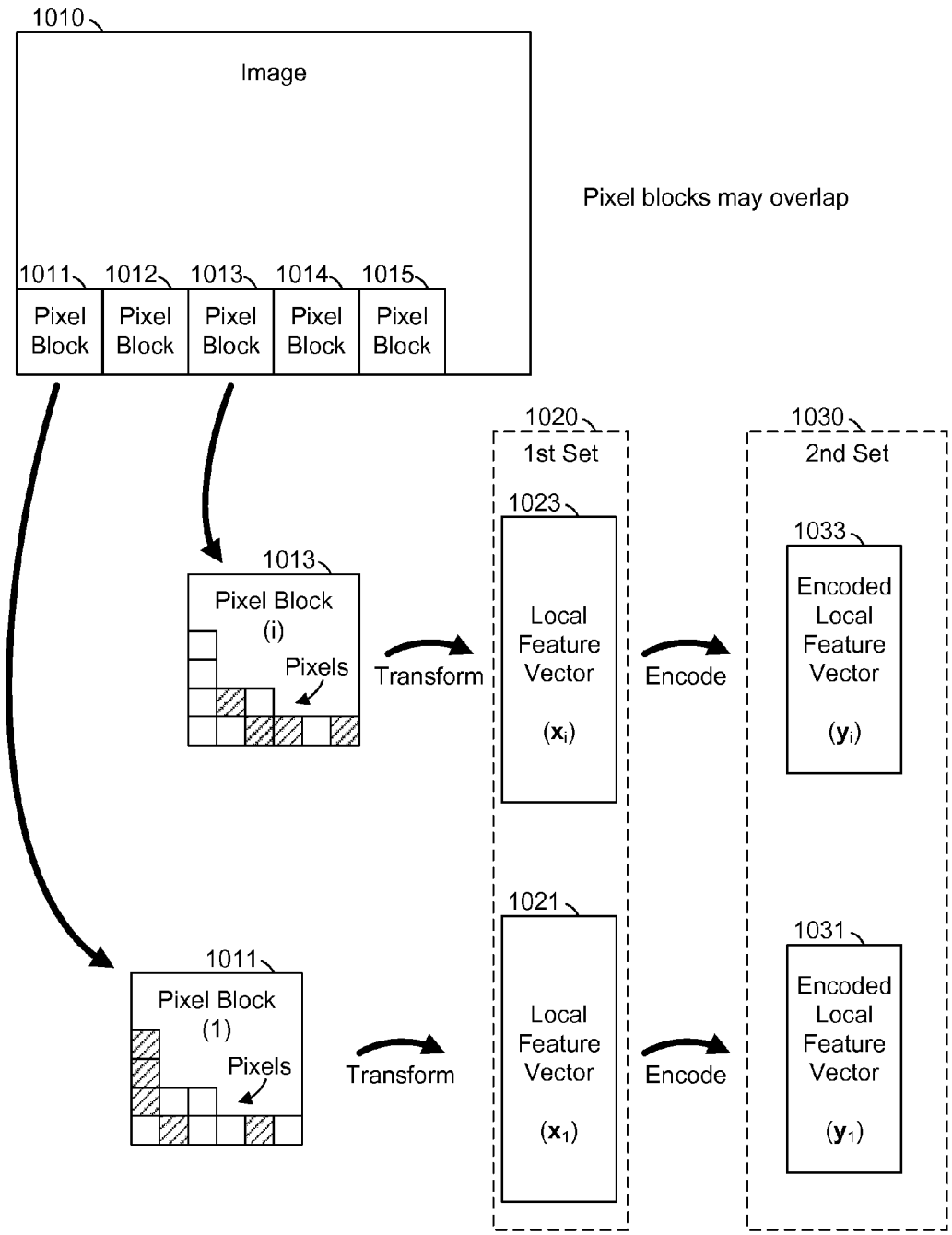
FIG. 10 is a conceptual diagram that illustrates generation and encoding of local feature vectors from pixel blocks of an image, according to some example embodiments.

Regarding details of LFE, FIG. 10 is a conceptual diagram that illustrates generation and encoding of local feature vectors (e.g., local feature vectors 1021 and 1023) from pixel blocks (e.g., pixel blocks 1011 and 1013) of an image 1010, according to some example embodiments. The image 1010 (e.g., a digital picture or photo) may depict a visual pattern (e.g., text rendered in a font, an object, a face, a scene, or any suitable combination thereof). The image 1010 may be stored in the database 115 and accessed by the image access module 210 of the hierarchy machine 110.

As shown in FIG. 10, the image 1010 may be divided (e.g., by the feature vector module 220 of the hierarchy machine 110) into blocks of pixels (e.g., pixel blocks 1011, 1012, 1013, 1014, and 1015). In some example embodiments, the pixel blocks overlap each other. That is, neighboring (e.g., adjacent) pixel blocks may overlap by one or more pixels (e.g., 10 pixels). The pixel block 1011 may be a first pixel block (e.g., having an index of 1 or indexed as 1) of the image 1010, and the pixel block 1013 may be an i-th pixel block (e.g., having an index of i) of the image 1010.

FIG. 10 illustrates the pixel block 1013 (e.g., the i-th pixel block) undergoing a mathematical transformation to generate a corresponding local feature vector 1023 (e.g., an i-th local feature vector, labeled "$x_i$"). This mathematical transformation may be performed by the feature vector module 220. Similarly, the pixel block 1011 (e.g., the first pixel block) may be mathematically transformed to generate its corresponding local feature vector 1021 (e.g., a first local feature vector, labeled "$x_i$"). This process may be repeated for all pixel blocks in the image 1010 (e.g., pixel blocks 1012, 1014, and 1015, as well as other pixel blocks in the image 1010). Accordingly, these generated local feature vectors (e.g., local feature vectors 1021 and 1023) may constitute a first set 1020 of vectors (e.g., local feature vectors) for the image 1010.

According to some example embodiments, the first set 1020 of vectors may each have a same number of dimensions, which may be called a first number of dimensions. For example, the first set 1020 of vectors may each have 10 dimensions as a result of the mathematical transformation being applied to each of the pixel blocks (e.g., pixel blocks 1011-1015) of the image 1010.

FIG. 10 further illustrates the first set 1020 of vectors being encoded (e.g., by the feature vector module 220) to generate a second set 1030 of vectors (e.g., encoded local feature vectors) for the image 1010. As shown, the second set 1030 of vectors includes an encoded local feature vector 1033 (e.g., an i-th encoded local feature vector, labeled "$y_i$") that corresponds to the local feature vector 1023 (e.g., the i-th local feature vector). That is, the encoded local feature vector 1033 may be an encoded representation of the local feature vector 1023. Similarly, the second set 1030 of vectors includes encoded local feature vector 1031 (e.g., a first encoded local feature vector, labeled "$y_1$") that corresponds to the local feature vector 1021 (e.g., the first local feature vector), and the encoded local feature vector 1031 may be an encoded representation of the local feature vector 1021.

According to certain example embodiments, the second set 1030 of vectors may each have a same number of dimensions, which may be distinct from the first number of dimensions for the first set 1020 of vectors, and which may be called a second number of dimensions. For example, the second set 1030 of vectors may each have six dimensions as a result of the encoding process being applied to each local feature vector of the first set 1020 of vectors for the image 1010.

Figure 11:
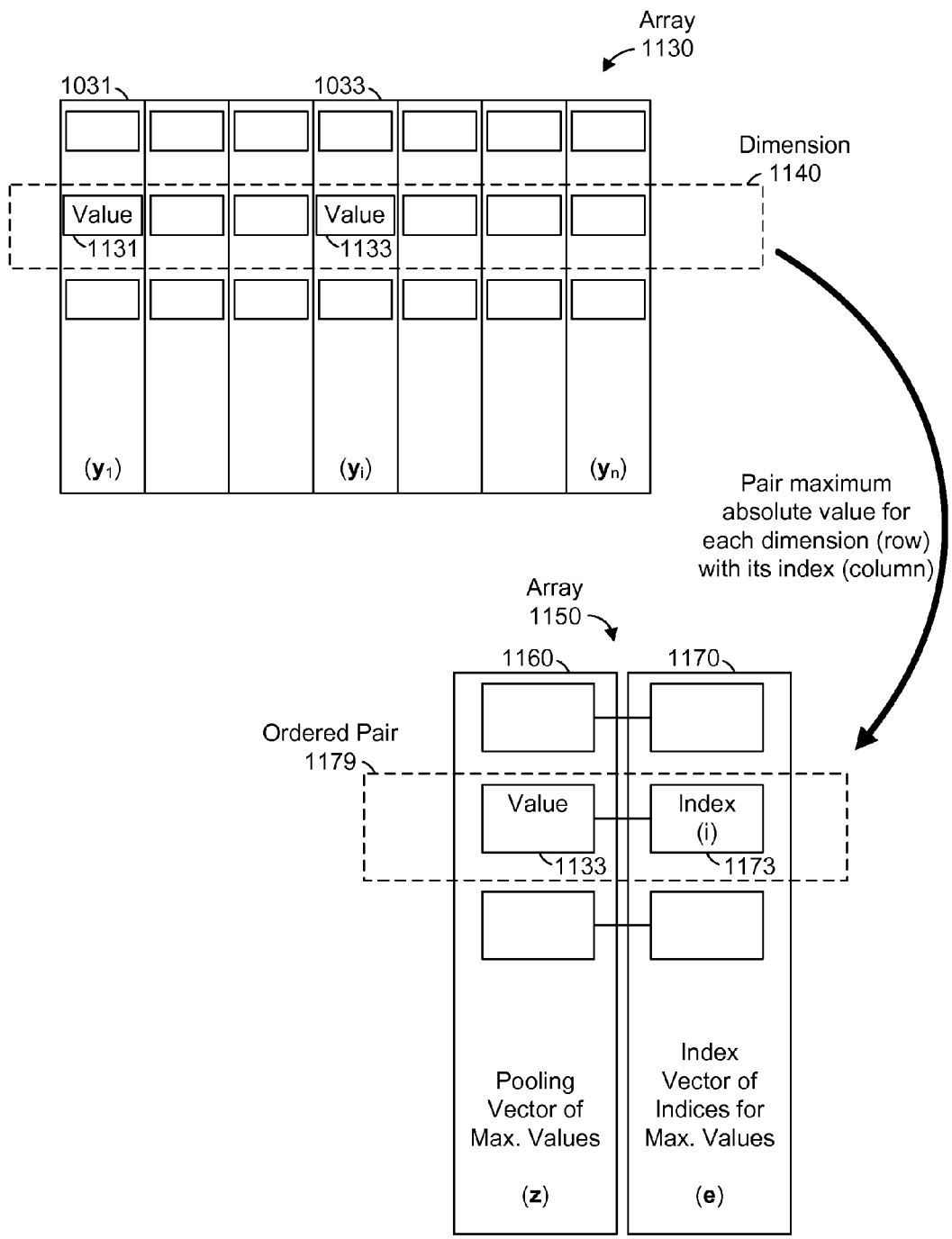
FIG. 11 is a conceptual diagram that illustrates generation of a first array of ordered pairs for the image, according to some example embodiments.

FIG. 11 is a conceptual diagram that illustrates generation of a first array 1150 of ordered pairs (e.g., ordered pair 1179) for the image 1010, according to some example embodiments. This generation of the first array 1150 may be performed by the feature vector module 220 of the hierarchy machine 110. As shown, the second set 1030 of encoded local feature vectors (e.g., encoded local feature vectors 1031 and 1033, as discussed above with respect to FIG. 10) may be arranged as an array 1130 of encoded local feature vectors (e.g., encoded local feature vectors 1031 and 1033) for the image 1010.

As noted above, each of the encoded local feature vectors (e.g., encoded local feature vectors 1031 and 1033) in the second set 1030 of vectors may have the same number (e.g., second number) of dimensions. Thus, in the array 1130, the feature vector module 220 may compare values (e.g., values 1131 and 1133) of a particular dimension 1140 for each of these encoded local feature vectors. This concept is illustrated in FIG. 11 by depicting the encoded feature vectors side-by-side in the array 1130, so that the dimension 1140 is represented by a row within the array 1130, while each encoded local feature vector is represented by a column within the array 1130. Hence, the value 1131 of the dimension 1140 in the encoded local feature vector 1031 may be compared to the value 1133 of the same dimension 1140 in the encoded local feature vector 1033.

By comparing values (e.g., comparing value 1131 to value 1133), the feature vector module 220 may identify a value for the dimension 1140 that significantly characterizes the image 1010. For example, the feature vector module 220 may compare all values for the dimension 1140 and determine that the value 1133 has a maximum absolute value (e.g., is a maximum value or a minimum value) among all other values (e.g., value 1131) for the dimension 1140 within the array 1130 of encoded local feature vectors. This process may be performed for each dimension (e.g., dimension 1140) represented in the second set 1030 of encoded local feature vectors (e.g., encoded local feature vectors 1031 and 1033). Accordingly, the feature vector module 220 may identify, determine, or otherwise obtain a characteristic value (e.g., a maximum absolute value or a maximum value) for each dimension of the encoded local feature vectors.

As shown in FIG. 11, these characteristic values may be paired (e.g., by the feature vector module 220) with indices that indicate which encoded local feature vector corresponds to which characteristic value. In other words, each characteristic value may be paired with the index of its corresponding encoded local feature vector, which is also the index of its corresponding pixel block within the image 1010. This may be accomplished by generating a pooling vector 1160 (e.g., a pooling vector of maximum values, labeled "z") and an index vector 1170 (e.g., an index vector of indices for maximum values, labeled "e"), and then generating the first array 1150 of ordered pairs (e.g., ordered pair 1179), where the ordered pairs map each characteristic value (e.g., value 1133) with its corresponding index (e.g., index 1173).

In the example shown in FIG. 11, the characteristic values are maximum values. Accordingly, the pooling vector 1160 is a vector of maximum values for the dimensions (e.g., dimension 1140) that are represented in the second set 1030 of encoded local feature vectors, and the index vector 1170 is a vector of indices for these maximum values. As an example, the value 1133 may be the maximum value for the dimension 1140, and the value 1133 corresponds to (e.g., comes from) the encoded local feature vector 1033, which may be the i-th encoded local feature vector in the second set 1030 of encoded local feature vectors (e.g., corresponding to the i-th pixel block 1013 of the image 1010). Therefore, the feature vector module 220 may pair the value 1133 with the index 1173 (e.g., labeled "i") to generate the ordered pair 1179.

By generating an ordered pair for each dimension (e.g., dimension 1140) of the array 1130 of encoded local feature vectors, the feature vector module 220 may generate the first array 1150 of ordered pairs. In some example embodiments, the feature vector module 220 generates the first array 1150 of ordered pairs by mapping the pooling vector 1160 to the index vector 1170, and storing the result as the first array 1150 of ordered pairs.

Figure 12:
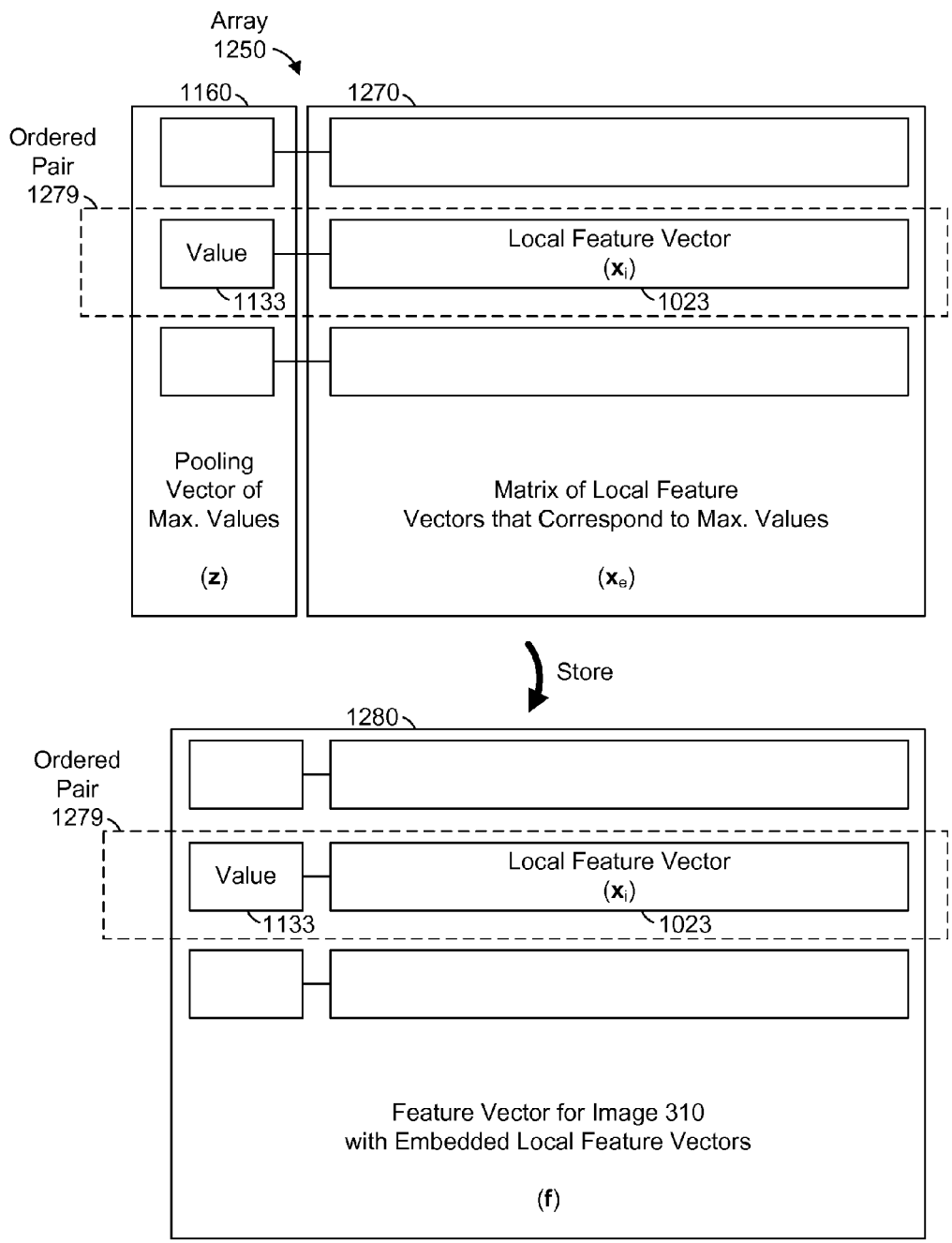
FIG. 12 is a conceptual diagram that illustrates generation of a second array of ordered pairs for the image, according to some example embodiments.

FIG. 12 is a conceptual diagram that illustrates generation of a second array 1250 of ordered pairs (e.g., ordered pair 1279) for the image 1010, according to some example embodiments. This generation of the second array 1250 may be performed by the feature vector module 220 of the hierarchy machine 110. As shown, the values (e.g., value 1133) of the pooling vector 1160 (e.g., a vector of maximum values, as discussed above with respect to FIG. 11) may be paired with their corresponding local feature vectors (e.g., local feature vector 1023 from the first set 1020 of local feature vectors, as discussed above with respect to FIG. 10). In FIG. 12, this is shown by arranging the pooling vector 1160 with a matrix 1270 (e.g., labeled "$x_e$") of local feature vectors that correspond to the values (e.g., value 1133) of the pooling vector 1160. As an example, the value 1133 may be the characteristic (e.g., maximum) value for the dimension 1140, and the value 1133 corresponds to (e.g., comes from) the local feature vector 1023, which may be the i-th local feature vector in the first set 1020 of local feature vectors (e.g., corresponding to the i-th pixel block 1013 of the image 1010). Therefore, the feature vector module 220 may pair the value 1133 with the local feature vector 1023 (e.g., labeled "$x_i$") to generate the ordered pair 1279. In certain example embodiments, the local feature vector 1023 is identified based on an index (e.g., "i") of its corresponding encoded local feature vector 1033.

By generating an ordered pair for each dimension (e.g., dimension 1140) of the array 1130 of encoded local feature vectors, the feature vector module 220 may generate the second array 1250 of ordered pairs. In some example embodiments, the feature vector module 220 generates the second array 1250 of ordered pairs by starting with the first array 1150 of ordered pairs and replacing the index vector 1170 with the matrix 1270 of local feature vectors.

As shown in FIG. 12, the resulting second array 1250 of ordered pairs may be stored as a feature vector 1280 (e.g., labeled "f") that corresponds to the image 1010 in its entirety. For example, after generating the second array 1250 of ordered pairs, the vector storage module 230 may store the second array 1250 in the database 115 as the feature vector 1280 for the image 1010. Similar to the second array 1250 of ordered pairs, the feature vector 1280 maps the values (e.g., value 1133) from the pooling vector 1160 to their corresponding local feature vectors (e.g., local feature vector 1023). This may have the effect of building a single vector of characteristic values (e.g., value 1133) for each dimension (e.g., dimension 1140) represented in the second set 1030 of encoded local feature vectors, where these characteristic values are paired with their respective original (e.g., unencoded) local feature vectors (e.g., local feature vector 1023). Thus, the feature vector 1280 for the image 1010 may provide a subset of its original local feature vectors (e.g., a subset of the first set 1020 of local feature vectors) along with corresponding characteristic values (e.g., maximum values) from their encoded counterparts (e.g., in the second set 1030 of encoded local feature vectors). Hence, the feature vector 1280 may be described as including (e.g., embedding) the most significant local feature vectors of the image 1010 (e.g., most significant for the purpose of recognizing of coarse-grained and fine-grained visual patterns).

Figure 13:
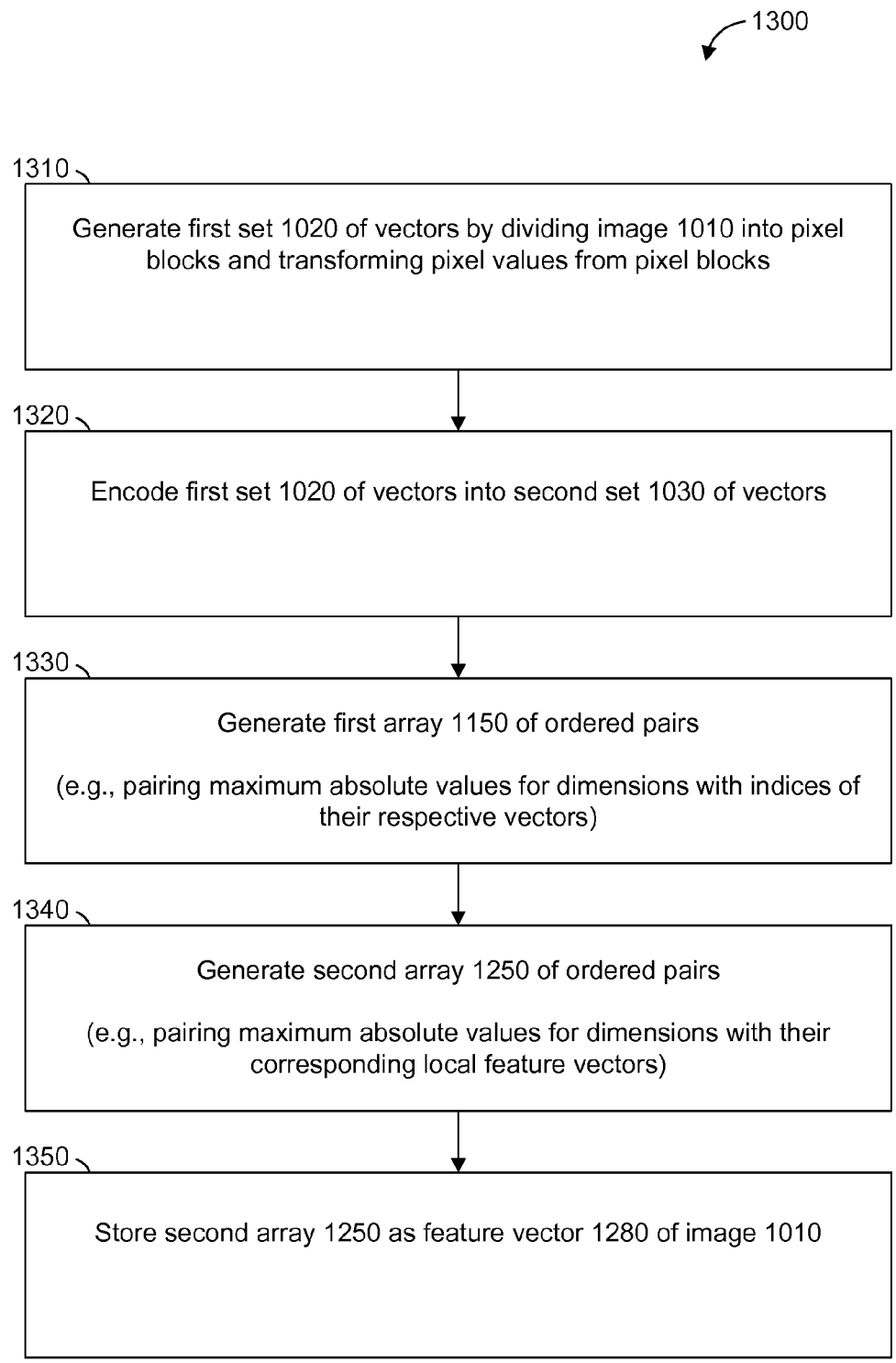
FIG. 13-15 are flowcharts illustrating operations of the hierarchy machine in performing a method of processing the image, according to some example embodiments.
Figure 14:
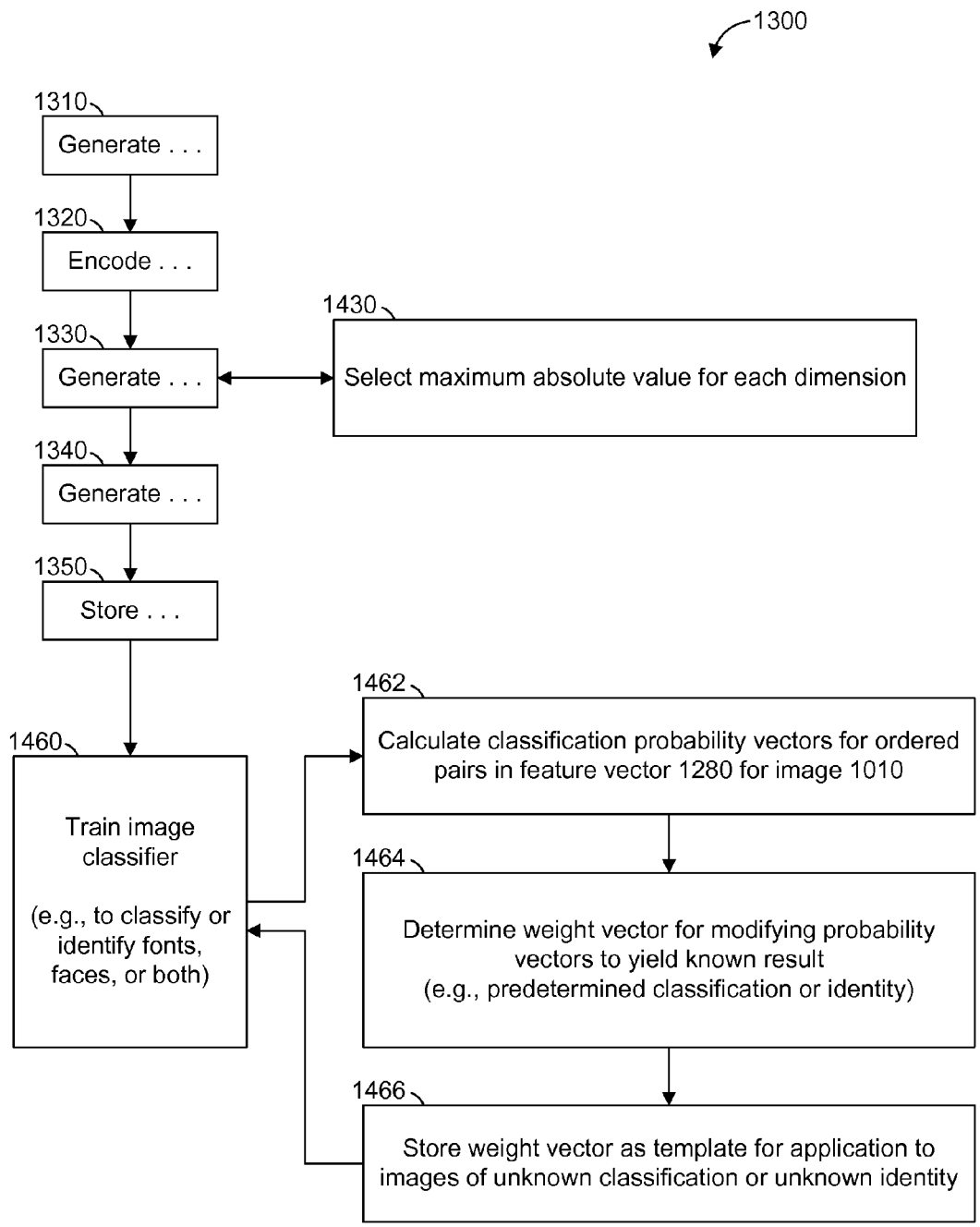
Figure 15:
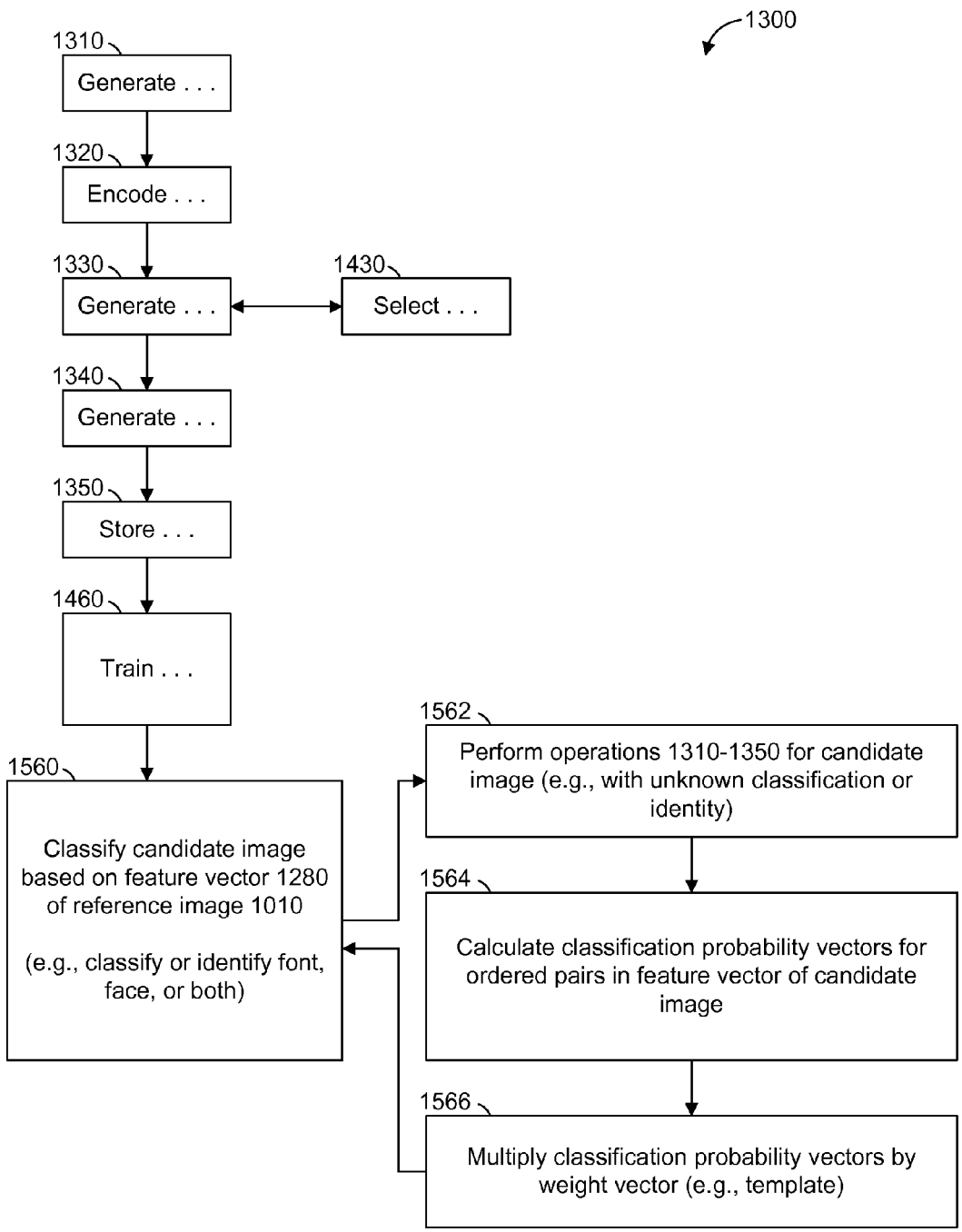

FIG. 13-15 are flowcharts illustrating operations of the hierarchy machine 110 in performing a method 1300 of processing the image 1010, according to some example embodiments. Operations in the method 1300 may be performed using modules described above with respect to FIG. 2. As shown in FIG. 13, the method 1300 includes operations 1310, 1320, 1330, 1340, and 1350.

Prior to operation 1310, the image access module 210 of the hierarchy machine 110 may access the image 1010 from the database 115. As a preprocessing operation, the feature vector module 220 may determine the pixel blocks (e.g., pixel blocks 1011-1015), for example, by dividing the image 1010 into overlapping or non-overlapping pixel blocks. In some example embodiments, this preprocessing operation is included as part (e.g., a precursor task, a subroutine, or a portion) of operation 1310.

In operation 1310, the feature vector module 220 of the hierarchy machine 110 generates the first set 1020 of local feature vectors (e.g., local feature vectors 1021 and 1023). An example is discussed above with respect to FIG. 3. As noted above, this may be performed by executing a mathematical transformation on each of the pixel blocks (e.g., pixel blocks 1011-1015) of the image 1010. For example, the mathematical transformation may generate the local feature vector 1021 from pixel values of the pixel block 1011, and a mathematical transformation may generate the local feature vector 1023 from pixel values of the pixel block 1013.

In operation 1320, the feature vector module 220 encodes the first set 1020 of local feature vectors into a second set 1030 of encoded local feature vectors. An example is discussed above with respect to FIG. 10. In some example embodiments, this encoding operation reduces the number of dimensions represented from a first number of dimensions to a second number of dimensions that is less than the first number of dimensions. Accordingly, the ordered pairs in the first array 1150 of ordered pairs may be equal in number to the second number of dimensions, and the ordered pairs in the second array 1250 of ordered pairs may likewise be equal in number to the second number of dimensions.

In operation 1330, the feature vector module 220 generates the first array 1150 of ordered pairs (e.g., ordered pair 1179). An example is discussed above with respect to FIG. 11. As noted above, the value 1133 may be determined to be a characteristic value (e.g., maximum absolute value or maximum value) for the dimension 1140. Hence, the ordered pair 1179 (e.g., a first ordered pair) may pair the value 1133 from the encoded local feature vector 1033 with an index of that encoded local feature vector 1033, and this index may indicate the pixel block 1013 that corresponds to that same encoded local feature vector 1033.

In operation 1340, the feature vector module 220 generates the second array 1250 of ordered pairs (e.g., ordered pair 1279). An example is discussed above with respect to FIG. 12. As noted above, the ordered pair 1279 (e.g., a second ordered pair) may pair the value 1133 from the encoded local feature vector 1033 with the local feature vector 1023 itself (e.g., the corresponding local feature vector for the value 1133). According to certain example embodiments, operation 1340 may include identifying the local feature vector 1023 (e.g., a first vector) based on an index (e.g., "i") of its corresponding encoded local feature vector 1033 (e.g., a second vector).

In operation 1350, the vector storage module 230 of the hierarchy machine 110 stores the second array 1250 of ordered pairs as the feature vector 1280 of the image 1010. An example is discussed above with respect to FIG. 12. The feature vector 1280 may be used as a representative of the significant features depicted in the image 1010 in any algorithm for visual pattern recognition. As noted above, the feature vector 1280 may be stored in the database 115. In some example embodiments, the feature vector 1280 is later accessed (e.g., by the image access module 210) for use by the classifier trainer module 250 as a basis for training the image classifier module 240.

As shown in FIG. 14, the method 1300 may include one or more of operations 1430 and 1460. According to some example embodiments, operation 1430 may be performed as part (e.g., a precursor task, a subroutine, or a portion) of operation 1330, in which the feature vector module 220 generates the first array 1150 of ordered pairs. In operation 1430, the feature vector module 220 determines the characteristic value for the dimension 1140 by selecting the maximum absolute value for the dimension 1140 (e.g., a dimension in common) among the encoded local feature vectors (e.g., encoded local feature vector 1033) in the array 1130 of encoded local feature vectors. Thus, the value 1133 may be selected as the characteristic value for the dimension 1140.

According to certain example embodiments, the image 1010 may be a test image or a training image whose classification, categorization, or identity is already known (e.g., predetermined). Thus, the feature vector 1280 of the image 1010 may be used to train an image classifier (e.g., image classifier module 240). This training may be performed by the classifier trainer module 250 of the hierarchy machine 110.

Operation 1460 may be performed after operation 1350, in which the vector storage module 230 stores the feature vector 1280 of the image 1010. In operation 1460, the classifier trainer module 250 of the hierarchy machine 110 trains the image classifier module 240 (e.g., an image classifier, image categorization module, visual pattern recognizer, or any suitable combination thereof). For example, the image classifier module 240 may be trained to classify, categorize, or identify fonts, objects, faces of persons, scenes, or any suitable combination thereof, depicted within the image 1010. Moreover, the image classifier module 240 may be trained to classify the image 1010 based on the second array 1250 of ordered pairs (e.g., stored in the database 115 as the feature vector 1280 of the image 1010).

For example, the image 1010 may depict some text rendered in a font (e.g., Times New Roman, bold and italic). In such a situation, performance of operation 1460 may train the image classifier module 240 to classify the image 1010 by classifying the font in which the text depicted in the image 1010 is rendered. Furthermore, the classifying of this font may be based on the second array 1250 of ordered pairs (e.g., stored in the database 115 as the feature vector 1280 of the image 1010), which may be used to characterize the visual pattern of the font.

As another example, the image 1010 may depict a face of a person (e.g., a famous celebrity or a wanted criminal). In such a situation, performance of operation 1460 may train the image classifier module 240 to classify the image 1010 by classifying the face depicted in the image 1010 (e.g., by classifying a facial expression exhibited by the face, classifying a gender of the face, classifying an age of the face, or any suitable combination thereof). Furthermore, the classifying of this face may be based on the second array 1250 of ordered pairs (e.g., stored in the database 115 as the feature vector 1280 of the image 1010), which may be used to characterize the face as a visual pattern or characterize a visual pattern within the face (e.g., a visual pattern that includes a scar, a tattoo, makeup, or any suitable combination thereof).

According to various example embodiments, one or more of operations 1462, 1464, and 1466 may be performed as part (e.g., a precursor task, a subroutine, or a portion) of operation 1460. In operation 1462, the classifier trainer module 250 calculates classification probability vectors for the second array 1250 of ordered pairs. For example, for the ordered pair 1279 (e.g., the second ordered pair), a classification probability vector may be calculated, and this classification probability vector may define a distribution of probabilities that the local feature vector 1023 (e.g., as a member of the ordered pair 1279) represents certain features that characterize various classes (e.g., categories) of images. As such, the distribution of probabilities includes a probability of the local feature vector 1023 (e.g., the first vector) representing a feature that characterizes a particular class of images (e.g., a particular style of font, such as italic or bold, or a particular gender of face).

For purposes of training the image classifier module 240, it may be helpful to modify the classification probability vectors calculated in operation 1462 (e.g., so that the modified classification probability vectors result in the known classification, categorization, or identity of the image 1010). This may be accomplished by determining a weight vector whose values (e.g., scalar values) may be applied as weights to the distribution of probabilities defined by each classification probability vector. Accordingly, in operation 1464, the classifier trainer module 250 determines such a weight vector (e.g., with the constraint that the weighted classification probability vectors produced the unknown result for the image 1010, when the weight vector is multiplied to each of the classification probability vectors).

With the effect of the weight vector, the modified (e.g., weighted) classification probability vectors define a modified distribution of probabilities, and the modified distribution of probabilities include a modified probability of the local feature vector 1023 (e.g., the first vector) representing a feature that characterizes the particular image class known for the image 1010. Moreover, by definition, the modified distribution of probability indicates that the local feature vector 1023 indeed does represent the feature that characterizes the known class of images for the image 1010. In other words, supposing that the image 1010 is known to belong to a particular class of images, the weight vector may be determined based on a constraint that the feature represented by the local feature vector 1023 characterizes this class of images to which the image 1010 belongs.

Once determined, the weight vector may be stored as a template (e.g., in a template or as the template itself). For example, the template may be stored in the database 115, and the template may be subsequently applicable to multiple classes of images (e.g., multiplied to classification probability vectors that are calculated for inside or outside the known classification for the image 1010). For example, the template may be applicable to images (e.g., candidate images) of unknown classification (e.g., unknown category) or unknown identity. Accordingly, in operation 1466, the classifier trainer module 250 may store the weight vector as such a template in the database 115.

As shown in FIG. 15, the method 1300 may include one or more of operations 1430, 1460, and 1560. Operation 1430 and 1460 are described above with respect to FIG. 14, and operation 1560 may be performed at a point in time after performance of operation 1460 (e.g., seconds, minutes, days, months, or years).

According to certain example embodiments, the image 1010 may be a reference image (e.g., a test image or a training image whose classification, categorization, or identity is already known). Supposing that the image classifier module 240 of the hierarchy machine 110 has been trained (e.g., by the classifier trainer module 250) based on the image 1010 (e.g., along with other reference images), the image classifier module 240 may be used to classify one or more candidate images of unknown classification, categorization, or identity. For example, the user 132 may use his device 130 to submit a candidate image (e.g., that depicts a visual pattern similar to that found in the image 1010) to the hierarchy machine 110 for visual pattern recognition (e.g., image classification, image categorization, or image identification). As discussed above with respect to FIG. 7, the training of the image classifier module 240 may be performed by the classifier trainer module 250 in operation 1460.

In operation 1560, image classifier module 240 classifies a candidate image (e.g., a further image, perhaps similar to the image 1010). For example, the image classifier module 240 may classify, categorize, or identify fonts, objects, faces of persons, scenes, or any suitable combination thereof, depicted within the candidate image. As noted above, the image classifier module 240 may be trained with the second array 1250 of ordered pairs (e.g., stored in the database 115 as the feature vector 1280 of the image 1010). Moreover, the image classifier module 240 may classify the candidate image based on a feature vector of the candidate image (e.g., a counterpart to the feature vector 1280 of the image 1010, generated in a manner similar to second array 1250 of ordered pairs).

For example, the candidate image may depict some text rendered in a font (e.g., Times New Roman, bold and italic). In such a situation, performance of operation 1560 may classify the candidate image by classifying the font in which the text depicted in the candidate image is rendered. Furthermore, the classifying of this font may be based on the feature vector of the candidate image (e.g., the candidate image's version of the feature vector 1280 for the image 1010, generated in a manner similar to second array 1250 of ordered pairs), which may be used to characterize the visual pattern of the font.

As another example, the candidate image may depict a face of a person (e.g., a famous celebrity or a wanted criminal). In such a situation, performance of operation 1560 may classify the candidate image by classifying the face depicted in the candidate image (e.g., by classifying a facial expression exhibited by the face, classifying a gender of the face, classifying an age of the face, or any suitable combination thereof). Furthermore, the classifying of this face may be based on the feature vector of the candidate image (e.g., the candidate image's counterpart to the feature vector 1280 of the image 1010, generated in a manner similar to second array 1250 of ordered pairs), which may be used to characterize the face as a visual pattern or characterize a visual pattern within the face (e.g., a visual pattern that includes a scar, a tattoo, makeup, or any suitable combination thereof).

According to various example embodiments, one or more of operations 1562, 1564, and 1566 may be performed as part (e.g., a precursor task, a subroutine, or a portion) of operation 1560. In operation 1562, the image classifier module 240 initiates performance of operations 1310-1350 for the candidate image (e.g., instead of the image 1010). Thus, the hierarchy machine 110 may generate a feature vector for the candidate image and store this feature vector in the database 115.

In operation 1564, the image classifier module 240 calculates classification probability vectors for the feature vector of the candidate image. This may be performed in a manner similar to that described above with respect to FIG. 7 for operation 1462. For example, for each ordered pair in the feature vector of the candidate image, a classification probability vector may be calculated to define a distribution of probabilities that the corresponding local feature vector (e.g., as a member of the ordered pair) represents features that characterize various classes (e.g., categories) of images. As such, the distribution of probabilities includes a probability of the local feature vector 1023 (e.g., the first vector) representing a feature that characterizes a particular class of images (e.g., a particular style of font, such as italic or bold, or a particular gender of face).

In operation 1566, the weight vector (e.g., templates) determined in operation 1464 (e.g., as discussed above with respect to FIG. 14) is applied by the image classifier module 240 to the classification probability vectors that were calculated in operation 1564 for the feature vector of the candidate image. For example, the image classifier module 240 may access the weight vector from the database 115 and multiply the classification probability vectors by the weight vector. With the effect of the weight vector, the modified (e.g., weighted) classification probability vectors for the candidate image define a modified distribution of probabilities that include a modified probability of a local feature vector of the candidate image representing a feature that characterizes a particular image class. As a result, the image classifier module 240 may cause (e.g., utilize, initiate, or execute) the trained image classifier module 240 to probabilistically determine a classification, categorization, or identity of the candidate image.

Regarding further details of LFE, an image classification machine (e.g., the hierarchy machine 110, which may be configured by one or more software modules to perform image classification) may classify a generic image by implementing a pipeline of first encoding local image descriptors (e.g., scale-invariant feature transform (SIFT) descriptors, local binary pattern (LBP) descriptors, kernel descriptors, or any suitable combination thereof) into sparse codes, and then pooling the sparse codes into a fixed-length image feature representation. With each image represented as a collection of local image descriptors $\{x_i\}_{i=1}^n$ with $x_i \in \Re^d$, the first coding step encodes each local descriptor into some code (e.g., a sparse code), $$y_i = f(x_i, T), \quad (1)$$

where $T=[t_1; t_2, \ldots t_K]$ denotes a template model or codebook of size K and $x_i \in \Re^d$, f is the encoding function (e.g., vector quantization, soft assignment, locality-constrained linear coding (LLC), or sparse coding), and $y_i \in \Re^K$ is the code for $x_i$. Then the pooling step obtains the final image representation by $$z = g(\{y_i\}_{i=1}^n), \quad (2)$$

where g is a pooling function that computes some statistics from each dimension of the set of vectors $\{y_i\}_{i=1}^n$ (e.g., average pooling or max pooling), and $z \in \Re^K$ is the pooled feature vector that may later be fed into a classifier.

While the above feature extraction pipeline may be effective at distinguishing different categories of objects, it may be insufficient to capture the subtle differences within an object category for fine-grained recognition (e.g., letter endings or other fine details that characterize various typefaces and fonts for text). According to example embodiments of the hierarchy machine 110, the above feature extraction pipeline may be extended by embedding local features into the pooling vector to preserve the fine-grained details (e.g., details of local letter parts in text). Specifically, using max pooling in Eqn. (2), the hierarchy machine 110 not only pools the maximum sparse coefficients, but also records the indices of these max pooling coefficients:

$$\{z,e\}=\max(\{y_i\}_{i=1}^n), \quad (3)$$

where z contains the max coefficients pooled from each dimension of the set $\{y_i\}_{i=1}^n$ and e is its index vector. Denoting $e_k=e(k)$ and $z_k=z(k)$, it can be seen that $z_k=y_{e_k}(k)$. Instead of using the max pooling coefficients as the final image feature representation, the pooling coefficients may be obtained together with the local descriptor that fires each of them $\{z_k,x_{e_k}\}_{k=1}^K$. The final feature representation may be constructed by concatenating these local descriptors weighted by their pooling coefficients:

$$f=[z_1 x_{e_1}; z_2 x_{e_2}; \ldots ; z_K x_{e_K}]. \quad (4)$$

The max pooling procedure may introduce a competing process for all the local descriptors to match templates. Each pooling coefficient $z_k$ measures the response significance of $x_{e_k}$ with respect to template $t_k$, which is effective at categorizing coarse object shapes, while the pooled local descriptor $x_{e_k}$ preserves the local part details that are discriminative for classifying subtle fine-grained differences when the pooling coefficients are similar. Therefore, the feature representation in Equation (4) can capture both coarse level object appearance changes and subtle object part changes. This feature representation may be called "local feature embedding" or "LFE."

Local feature embedding may embed the local descriptors from max pooling into a much higher dimensional space of $\Re^{Kd}$. For instance, if we use 59-dimensional LBP descriptors and a codebook size of 2048, the dimension of f without using spatial pyramid matching (SPM) is already 120,832. Although embedding the image into higher dimensional spaces may be amicable to linear classifiers, training classifiers for very large-scale applications can be very time-consuming. Moreover, a potential drawback of training classifiers for large-scale classification is that, when images of new categories become available or when new images are added to existing categories, the retraining of new classifiers may involve a very high computational cost. Accordingly, the hierarchy machine 110 may utilize a new large-scale classification algorithm based on local feature metric learning and template selection, which can be readily generalized to new classes and new data at very little computational cost. For this purpose, the LFE feature in Equation (4) may be modified into a local feature set representation:

$$f=\{(z_k,x_{e_k})\}_{k=1}^K \quad (5)$$

In a large-scale visual font recognition task, the dataset may be open-ended. For example, new font categories may appear over time and new data samples could be added to the existing categories. It may be important for a practical classification algorithm to be able to generalize to new classes and new data at very little cost. Nearest class mean (NCM), together with metric learning, may be used for certain large-scale classification tasks in which each class is represented by a mean feature vector that is efficient to compute. The hierarchy machine 110 may use NCM based on pooled local features to form a set of weak classifiers. Furthermore, a max-margin template selection scheme may be implemented to combine these weak classifiers for the final classification, categorization, or identification of a visual pattern within an image.

Supposing that the LFE feature $f=\{(z_k,x_{e_k})\}_{k=1}^K$ for each image is known (e.g., given or predetermined), a recognition system may generate (e.g., determine or calculate) a Mahalanobis distance metric for each pooled local feature space, under which an NCM classifier may be formulated using multi-class logistic regression, where the probability for a class c given a pooled local feature $x_{e_k}$ is defined by $$p(c \mid x_{e_k}) = \frac{\exp\left(-\|\mu_k^c - x_{e_k}\|_{W_k}^2\right)}{\sum_{c'=1}^C \exp\left(-\|\mu_k^{c'} - x_{e_k}\|_{W_k}^2\right)}, \quad (6)$$

where $\mu_k^c$ is the class mean vector for the k-th pooled local features in class c, and $$\|\mu_k^c - x_{e_k}\|_{W_k}^2 = (\mu_k^c - x_{e_k})^T W_k^T W_k (\mu_k^c - x_{e_k}). \quad (7)$$

Denoting $\Sigma_k^{-1}=W_k^T W_k$, it can be seen that the k-th pooled feature space (or its projected subspace) may be modeled as a Gaussian distribution with an inverse covariance matrix $\Sigma_k^{-1}$.

A metric learning method called within-class covariance normalization (WCCN) may be used to learn the metric $W_k$ for the k-th pooled feature space. First, interpreting $z_k$ as the probabilistic response of $x_{e_k}$ to template $t_k$, the class mean vector $\mu_k^c$ may be computed as $$\mu_k^c = \frac{1}{Z^c} \sum_{i \in I_c} z_k^i x_{e_k}^i, \quad (8)$$

where i is the index for the i-th training image with LFE feature $f^i=\{z_k^i,x_{e_k}^i\}_{k=1}^K$, $I_c$ denotes the sample index set for class c, and $Z_c=\sum_{i \in I_c} z_k^i$ is a normalization factor. Then, the expected within-class covariance matrix over all classes may be computed as $\Sigma_k$:

$$\sum_k = E[\sum_k^{c'}] \approx \sum_{c'=1}^C p(c') \sum_k^{c'}, \quad (9)$$

where $$p(c') = \frac{\sum_{i \in I_{c'}} z_k^i}{\sum_i z_k^i}, \quad (10)$$

is the empirical probability of class c', and $\Sigma_k^{c'}$ is the within-class covariance for class c' defined as $$\sum_k^{c'} \approx \frac{1}{Z^{c'}} \sum_{i \in I_{c'}} z_k^i (x_{e_k}^i - \mu_k^{c'})(x_{e_k}^i - \mu_k^{c'})^T, \quad (11)$$

with $Z^{c'}=\sum_{i \in I_{c'}} z_k^i$. In practice, empirical estimates of $\Sigma_k$ may be noisy. Therefore, a certain amount of smoothness may be added by shrinking $\Sigma_k$ towards the scalar covariance as $$\hat{\sum}_k = (1-\alpha)\sum_k + \alpha\sigma^2 I, \alpha \in [0,1], \quad (12)$$

where $\hat{\Sigma}_k$ represents a smoothed version of the empirical expected within-class covariance matrix, I is the identity matrix, and $\sigma^2$ can take the value of trace($\Sigma_k$). An example system may therefore compute the eigen-decomposition for each $\hat{\Sigma}_k = U_k D_k U_k^T$ where $U_k$ is orthonormal and $D_k$ is a diagonal matrix of positive eigenvalues. Then the feature projection matrix $W_k$ in Equation (6) may be defined as $$W_k = D_k^{-1/2} U_k^T, \quad (13)$$

which basically spheres the data based on the common covariance matrix. In the transformed space, NCM may be used as the classifier, which may lay the foundation for the multi-class logistic regression in Equation (6).

To further enhance the discriminative power of $W_k$, the projection components with high within-class variability may be depressed, for example, by discarding the first few largest eigen-values in $D_k$, which corresponds to the subspace where the feature similarity and label similarity are most out of sync (e.g., with large eigenvalues corresponding to large within-class variance). In such a case, the solution of WCCN may be interpreted as the result of discriminative subspace learning.

After obtaining the metric for each pooled local feature space, and assuming the templates in T are independent, the hierarchy machine 110 may evaluate the posterior of a class c for the input image feature representation f by combining the outputs of Equation (6) using a log-linear model:

$$p(c|f) = \frac{1}{H}\exp\left(a + \sum_k w_k \log p(c|x_{e_k})\right) \quad (14)$$

where H is a normalization factor to ensure the integrity of p(c|f), $w_k$ weights the contribution of each pooled local feature to the final classification, and a is a small constant offset. Here, the weight vector $w=[w_1, w_2, \ldots, w_K]^T$, which may be shared by all classes, may act to select the most discriminative templates from the template model $T=\{t_K\}_{k=1}^K$ for the given classification task. Then, the classification task for f is simply to choose the class with the largest posterior:

$$c^* = \underset{c'}{\operatorname{argmax}}\ p(c'|f). \quad (15)$$

Alternatively, the hierarchy machine 110 may be configured to treat the multi-class logistic regression for each pooled local feature as a weak classifier, and then linearly combine them to obtain a strong classifier:

$$s(c|f) = \sum_{k=1}^K w_k p(c|x_{e_k}). \quad (16)$$

In this way, the hierarchy machine 110 may avoid the numerical instability and data scale problem of logarithm in Equation (14). The score function s(c|f) need not have a probabilistic interpretation anymore, but the classification task may again be to find the class with the largest score output. In practice, this formulation may work slightly better than a log-linear model, and this linear model may be implemented in the hierarchy machine 110.

Given a set of training samples $\{f^i, c^i\}_{i=1}^N$, where $c^i \in \{1, \ldots, C\}$ is the class label for the i-th data sample, it is possible to find the optimal weight vector w such that the following constraints are best satisfied:

$$s(c^i|f^i) > s(c'|f^i), \forall i, c' \neq c^i, \quad (17)$$

which translates to:

$$\sum_{k=1}^K w_k(p(c^i|x_{e_k}^i) - p(c'|x_{e_k}^i)) > 0, \quad (18)$$

$$\forall i, c' \neq c^i.$$

In order to learn w, it may be helpful to define a cost function using a multi-class hinge loss function to penalize violations of the above constraints:

$$L(f^i, c^i; w) = \sum_{c' \neq c^i} \max\{0, -\gamma^i(c') + 1\}, \quad (19)$$

where $$\gamma^i(c') = \sum_{k=1}^K w_k(p(c^i|x_{e_k}^i) - p(c'|x_{e_k}^i)). \quad (20)$$

Then w may be obtained by solving the following optimization:

$$\min_w \lambda \sum_{i=1}^N L(f^i, c^i; w) + \rho(w), \quad (21)$$

where $\rho(w)$ regularizes the model complexity. Note that when $\rho(w) = \|w\|_2^2$ Equation (21) is a classical one-class support vector machine (SVM) formulation. To see this, denoting $$p^i(c) = [p(c|x_{e_1}^i); p(c|x_{e_2}^i); \ldots; p(c|x_{e_K}^i)], \quad (22)$$

and $q^i(c') = p^i(c^i) - p^i(c')$, Equation (19) may translate to $$L(f^i, c^i; w) = \sum_{c' \neq c^i} \max\{0, w^T q^i(c') \cdot 1 + 1\}, \quad (23)$$

where $q^i(c')$ may be regarded as feature vectors with only positive label +1. Therefore, the optimization in Equation (21) is the classical SVM formulation with only positive class and thus can be solved by an SVM package. The regularization term $\rho(w)$ may also take the form of $\|w\|_1$, where the $l^1$-norm promotes sparsity for template selection, which may have better generalization behavior when the size K of the template model T is very large.

After the WCCN metric is obtained for all pooled local feature spaces and the template weights based on LFE, the classification task for a given f may be straightforward: first compute the local feature posteriors using Equation (6), combine them with the learned weights w, and then determine (e.g., predict, infer, or estimate) the class label by selecting the largest score output $c^* = \max_{c'} s(c'|f)$. When new data or font classes are added to the database, it is sufficient to calculate the new class mean vectors and estimate the within-class covariances to update the WCCN metric incrementally. Because the template model is universally shared by all classes, the template weights do not need to be retrained. Therefore, the above-described algorithm (e.g., as implemented in the hierarchy machine 110) can readily adapt to new data or new classes at little added computational cost.

According to various example embodiments, one or more of the methodologies described herein may facilitate generation of a hierarchy of visual pattern clusters, as well as facilitate visual pattern recognition in an image. As noted above, generation and use of such a hierarchy of visual pattern clusters may enable a system to omit unrelated classifiers and execute only those classifiers with at least a threshold probability of actually classifying a candidate visual pattern. Thus, in situations with large numbers of visual patterns, one or more of the methodologies described herein may enable efficient and scalable automated visual pattern recognition. Moreover, one or more of the methodologies described herein may facilitate classification, categorization, or identification of a visual pattern depicted within an image, such as a font used for rendering text or a face that appears in the image. Hence, one or more the methodologies described herein may facilitate font recognition, facial recognition, facial analysis, or any suitable combination thereof.

When these effects are considered in aggregate, one or more of the methodologies described herein may obviate a need for certain efforts or resources that otherwise would be involved in recognition of visual patterns in images. Efforts expended by a user in recognizing a visual pattern that appears within an image may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 16:
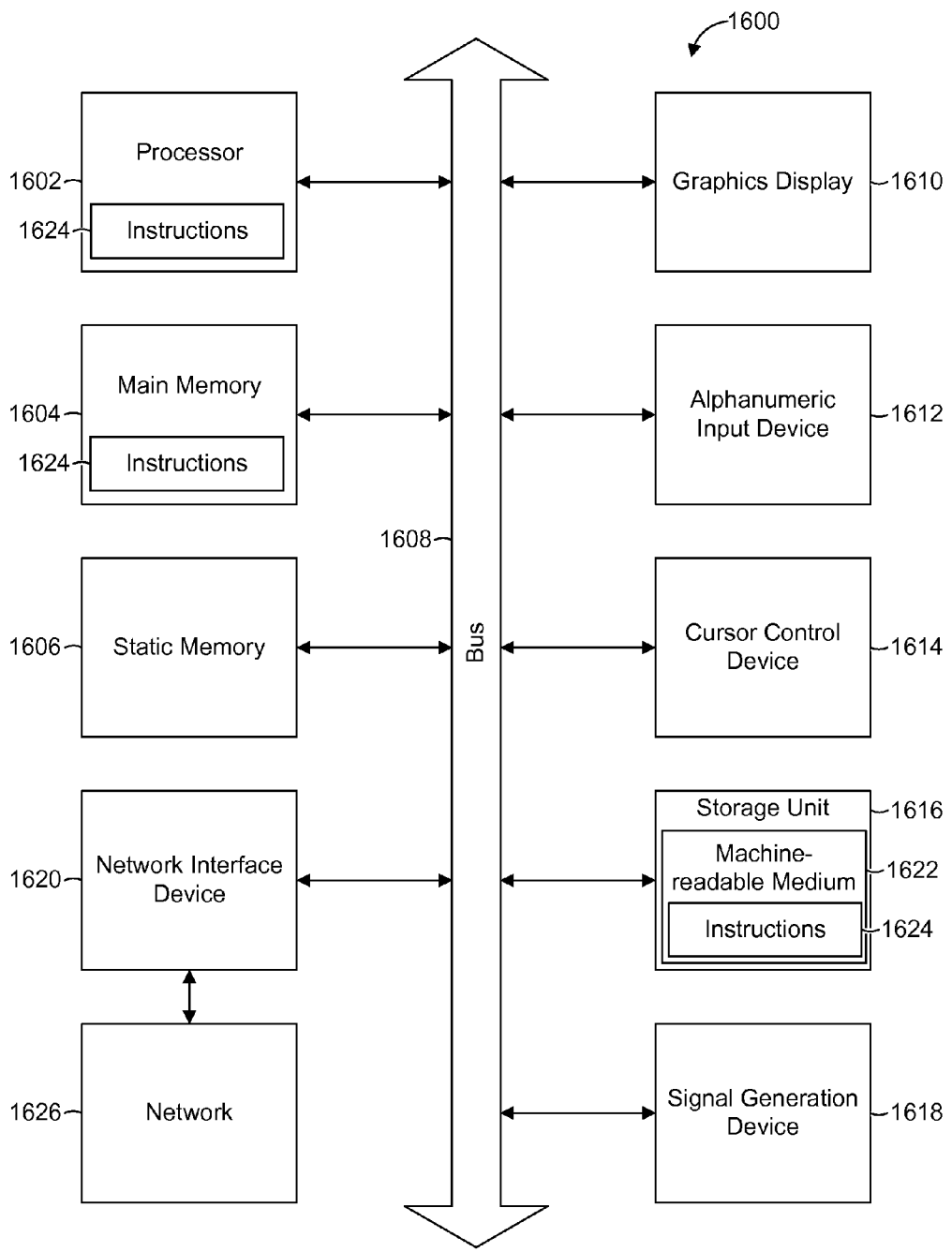
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 16 shows a diagrammatic representation of the machine 1600 in the example form of a computer system and within which instructions 1624 (e.g., software, a program, an application, an applet, an app, or other executable code) for causing the machine 1600 to perform any one or more of the methodologies discussed herein may be executed, in whole or in part. In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a distributed (e.g., peer-to-peer) network environment. The machine 1600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include a collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include a graphics display 1610 (e.g., a plasma display panel (PDP), a light emitting diode (LED) display, a liquid crystal display (LCD), a projector, or a cathode ray tube (CRT)). The machine 1600 may also include an alphanumeric input device 1612 (e.g., a keyboard), a cursor control device 1614 (e.g., a mouse, a touchpad, a trackball, a joystick, a motion sensor, or other pointing instrument), a storage unit 1616, a signal generation device 1618 (e.g., a speaker), and a network interface device 1620.

The storage unit 1616 includes a machine-readable medium 1622 (e.g., a tangible and non-transitory machine-readable storage medium) on which are stored the instructions 1624 embodying any one or more of the methodologies or functions described herein. The instructions 1624 may also reside, completely or at least partially, within the main memory 1604, within the processor 1602 (e.g., within the processor's cache memory), or both, during execution thereof by the machine 1600. Accordingly, the main memory 1604 and the processor 1602 may be considered as machine-readable media (e.g., tangible and non-transitory machine-readable media). The instructions 1624 may be transmitted or received over a network 1626 (e.g., network 190) via the network interface device 1620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1600), such that the instructions, when executed by one or more processors of the machine (e.g., processor 1602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
classifying a reference set of visual patterns that belong to a parent class into mutually exclusive child classes that include first and second child classes, a visual pattern from the reference set being classified into the first child class instead of the second child class;
modifying a weight vector that corresponds to the parent class, the modified weight vector altering a first probability that the visual pattern belongs to the first child class and a second probability that the visual pattern belongs to the second child class;
based on the altered first and second probabilities, removing mutual exclusivity from the first and second child classes by adding the visual pattern to the second child class; and
using a processor, generating a hierarchy of classes of visual patterns, the hierarchy including the parent class and the mutually nonexclusive first and second child classes that each include the visual pattern.

2. The method of claim 1, wherein the classifying of the reference set includes:
computing an affinity matrix that quantifies degrees to which the visual patterns that belong to the parent class are similar to each other; and
grouping the visual patterns into the mutually exclusive child classes by applying spectral clustering to the affinity matrix.

3. The method of claim 2, wherein the computing of the affinity matrix includes:
calculating a feature vector of an image that depicts the visual pattern;
calculating vector distances between the visual pattern and other visual patterns in the reference set based on the feature vector; and
including representations of the vector distances in the affinity matrix as quantifiers of similarity between the visual pattern and the other visual patterns.

4. The method of claim 3, wherein the computing of the affinity matrix includes:
calculating the representations of the vector distances by performing an exponential transform on ratios of each of the vector distances to a median value of the vector distances.

5. The method of claim 3, wherein the computing of the affinity matrix includes:
increasing sparseness of the affinity matrix by setting a representation of a vector distance to zero based on the representation falling below a minimum threshold value.

6. The method of claim 3, wherein the computing of the affinity matrix includes:
increasing sparseness of the affinity matrix by setting a representation of a vector distance to zero based on the representation falling outside of a predetermined subset of largest values among the representations.

7. The method of claim 3, wherein:
the calculating of the feature vector calculates the feature vector with local feature embedding (LFE).

8. The method of claim 1, wherein:
the classifying of the reference set of visual patterns is based on the weight vector prior to the modifying of the weight vector.

9. The method of claim 1, wherein:
the classifying of the reference set misclassifies the visual pattern into the first child class instead of the second child class; and
the modifying of the weight vector is in response to the visual pattern being misclassified.

10. The method of claim 1, wherein:
the classifying of the reference set of visual patterns is performed by a classifier module assigned to the parent class; and
the weight vector is specific to the classifier module for the parent class.

11. The method of claim 10, wherein:
the classifying of the reference set assigns a portion of the reference set to the first child class; and the method further comprises:
classifying the portion of the reference set into mutually exclusive grandchild classes, the classifying of the portion being performed by a further classifier module assigned to the first child class.

12. The method of claim 1, wherein:
the removing of mutual exclusivity from the first and second child classes is in response to the altered first and second probabilities exceeding a threshold value.

13. The method of claim 1, wherein:
the modified weight vector includes a third probability that the visual pattern belongs to a third child class of the parent class;
the removing of mutual exclusivity from the first and second child classes does not remove mutual exclusivity from the third child class and is further based on the third probability falling below a threshold value.

14. The method of claim 1, wherein:
the modified weight vector includes a third probability that the visual pattern belongs to a third child class of the parent class; and
the removing of mutual exclusivity from the first and second child classes is further based on the third probability falling outside of a predetermined subset of largest probabilities that the visual pattern belongs to one of the mutually exclusive child classes.

15. The method of claim 1 further comprising:
determining that a percentage of the reference set is misclassified by the classifying of the reference set; and
iterating the classifying of the reference set and the modifying of the weight vector until the percentage falls below a threshold value.

16. The method of claim 1 further comprising:
classifying a candidate visual pattern into the first child class by processing an image that depicts the candidate visual pattern with a classifier module assigned to the parent class, the classifier module including the modified weight vector.

17. A non-transitory machine-readable storage medium comprising instructions that, when executed by one or more processors of a machine, cause the machine to perform operations comprising:
- classifying a reference set of visual patterns that belong to a parent class into mutually exclusive child classes that include first and second child classes, a visual pattern from the reference set being classified into the first child class instead of the second child class;
- modifying a weight vector that corresponds to the parent class, the modified weight vector altering a first probability that the visual pattern belongs to the first child class and a second probability that the visual pattern belongs to the second child class;
- based on the altered first and second probabilities, removing mutual exclusivity from the first and second child classes by adding the visual pattern to the second child class; and
- generating a hierarchy of classes of visual patterns, the hierarchy including the parent class and the mutually nonexclusive first and second child classes that each include the visual pattern.

18. The non-transitory machine-readable storage medium of claim 17, wherein the operations further comprise:
- classifying a candidate visual pattern into the first child class by processing an image that depicts the candidate visual pattern with a classifier module assigned to the parent class, the classifier module including the modified weight vector.

19. A system comprising:
- a classifier module configured to classify a reference set of visual patterns that belong to a parent class into mutually exclusive child classes that include first and second child classes, a visual pattern from the reference set being classified into the first child class instead of the second child class;
- a trainer module configured to modify a weight vector that corresponds to the parent class, the modified weight vector altering a first probability that the visual pattern belongs to the first child class and a second probability that the visual pattern belongs to the second child class;
- an assignment module configured to, based on the altered first and second probabilities, remove mutual exclusivity from the first and second child classes by adding the visual pattern to the second child class; and
- a processor configured by a hierarchy module to generate a hierarchy of classes of visual patterns, the hierarchy including the parent class and the mutually nonexclusive first and second child classes that each include the visual pattern.

20. The system of claim 19, wherein:
- the assignment module is configured to remove mutual exclusivity from the first and second child classes in response to the altered first and second probabilities exceeding a threshold value.

\* \* \* \* \*